(12) United States Patent
Oyanagi et al.

(10) Patent No.: US 8,097,075 B2
(45) Date of Patent: *Jan. 17, 2012

(54) INK SET, INK JET RECORDING METHOD, RECORDED MATTER, AND INK JET RECORDING APPARATUS

(75) Inventors: Takashi Oyanagi, Matsumoto (JP); Akio Ito, Chino (JP); Seishin Yoshida, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/497,730

(22) Filed: Jul. 6, 2009

(65) Prior Publication Data

US 2010/0009136 A1    Jan. 14, 2010

(30) Foreign Application Priority Data

Jul. 8, 2008 (JP) ................................. 2008-178021

(51) Int. Cl.
*C09D 11/02* (2006.01)
*B41J 2/01* (2006.01)

(52) U.S. Cl. ............... 106/31.6; 106/31.65; 106/31.86; 106/31.9; 523/160; 347/100

(58) Field of Classification Search ............... 106/31.6, 106/31.65, 31.9, 31.86; 523/160; 347/100; 428/195.1
See application file for complete search history.

(56) References Cited

U.S. PATENT DOCUMENTS

| | | | | |
|---|---|---|---|---|
| 7,156,909 B2* | 1/2007 | Oyanagi et al. | ............ | 106/31.86 |
| 7,303,619 B2* | 12/2007 | Oyanagi | ............ | 106/31.6 |
| 7,438,405 B2 | 10/2008 | Ichizawa et al. | | |
| 7,513,945 B2 | 4/2009 | Nakano et al. | | |
| 2003/0222959 A1 | 12/2003 | Yamanouchi et al. | | |
| 2004/0266907 A1* | 12/2004 | Sugita et al. | ............ | 523/160 |
| 2007/0044684 A1 | 3/2007 | Nakano et al. | | |
| 2008/0081119 A1* | 4/2008 | Oyanagi et al. | ............ | 427/385.5 |
| 2008/0145628 A1* | 6/2008 | Oyanagi et al. | ............ | 428/206 |
| 2008/0173214 A1* | 7/2008 | Oyanagi et al. | ............ | 106/31.25 |
| 2008/0182085 A1* | 7/2008 | Oyanagi et al. | ............ | 428/195.1 |
| 2008/0213518 A1* | 9/2008 | Oyanagi et al. | ............ | 106/31.65 |
| 2008/0250970 A1* | 10/2008 | Oyanagi et al. | ............ | 106/31.65 |
| 2009/0053415 A1* | 2/2009 | Isobe | ............ | 106/31.13 |
| 2009/0075036 A1* | 3/2009 | Itano et al. | ............ | 428/195.1 |
| 2009/0214833 A1* | 8/2009 | Oyanagi et al. | ............ | 428/195.1 |
| 2009/0220695 A1* | 9/2009 | Oyanagi et al. | ............ | 106/31.6 |

(Continued)

FOREIGN PATENT DOCUMENTS

EP        1752404 A        2/2007

(Continued)

OTHER PUBLICATIONS

Patent Abstract of Japan Publication No. 2002-079960 Published Jun. 26, 2002.

(Continued)

*Primary Examiner* — Helene Klemanski
(74) *Attorney, Agent, or Firm* — Ladas & Parry LLP

(57) ABSTRACT

An ink set includes an oil-based ink composition containing a metallic pigment; and at least one oil-based ink composition selected from the group consisting of a chromatic color ink composition containing a chromatic color oil dye, a black ink composition containing a black oil dye, and a colorless and transparent ink composition that does not contain a colorant.

20 Claims, 5 Drawing Sheets

U.S. PATENT DOCUMENTS

2010/0009136 A1* 1/2010 Oyanagi et al. ............ 428/195.1

FOREIGN PATENT DOCUMENTS

| | | | |
|---|---|---|---|
| EP | 1837381 | A | 9/2007 |
| EP | 1806387 | A | 11/2007 |
| JP | 11-165420 | | 6/1999 |
| JP | 2002-079960 | | 6/2002 |
| JP | 2002-179960 | | 6/2002 |
| JP | 2003-292836 | | 10/2003 |
| JP | 2003-306625 | | 10/2003 |
| JP | 2004-195797 | | 7/2004 |
| JP | 2004-197055 | | 7/2004 |
| JP | 2005-008690 | | 1/2005 |
| JP | 2005-068250 | | 3/2005 |
| JP | 2005-068251 | | 3/2005 |
| JP | 2005-068252 | | 3/2005 |
| JP | 2005-96254 | | 4/2005 |
| JP | 2006-123529 | | 5/2006 |
| JP | 2006-265292 | | 10/2006 |
| JP | 2006-265524 | | 10/2006 |
| JP | 2006-274029 | | 12/2006 |
| JP | 2007-016103 | | 1/2007 |
| JP | 2007-46034 | | 2/2007 |
| JP | 2007-131741 | | 5/2007 |
| JP | 2007-169451 | | 7/2007 |
| WO | 93-21235 | A | 10/1993 |
| WO | WO 2006/112031 | A1 * | 10/2006 |

OTHER PUBLICATIONS

Patent Abstract of Japan Publication No .2005-068250 Published Mar. 17, 2005.
English Translation of JP2002-179960, Jun. 2002.
Patent Abstract of Japan Publication No. 2003-292836 Published Oct. 15, 2003.
Patent Abstract of Japan Publication No. 2003-306625 Published Oct. 31, 2003.
Patent Abstract of Japan Publication No. 2006-265524 Published Oct. 5, 2006.
Patent Abstract of Japan Publication No. 2007-023161 Published Feb. 1, 2007.
Patent Abstract of Japan Publication No. 2007-131741 Published May 31, 2007.
Patent Abstract of Japan Publication No. 2007-169451 Published Jul. 5, 2007.
Search Report of EPO Application 07024545.1 Issued Apr. 21, 2008.
English Abstract of Japanese Application 2006-274029 Published Dec. 10, 2006.
English Abstract of Japanese Application 2006-123529 Published May 18, 2006.
English Abstract of Japanese Application 2005-96254 Published Apr. 13, 2005.
Japanese Examination Result Issued on May 25, 2011.
Machine Translation of Japanese Application 11-165420 Published Jun. 22, 1999.
Machine Translation of Japanese Application 2004-195797 Published Jul. 15, 2004.
Machine Translation of Japanese Application 2004-197055 Published Jul. 15, 2004.
Patent English Abstract of Japanese Application 2005-008690 Published Jan. 13, 2005.

* cited by examiner

INK SET, INK JET RECORDING METHOD, RECORDED MATTER, AND INK JET RECORDING APPARATUS

BACKGROUND

1. Technical Field

The present invention relates to an ink set, an ink jet recording method, a recorded matter recorded by the ink jet recording method, and an ink jet recording apparatus. In particular, the invention relates to an ink set, an ink jet recording method, a recorded matter recorded by the ink jet recording method, and an ink jet recording apparatus in which a printed surface having a metallic gloss of any color tone can be formed.

2. Related Art

Hitherto, in order to form a printed surface having a metallic gloss on a printed matter, a printing method using a printing ink containing a gold powder or a silver powder which is prepared from brass particles, aluminum particles, or the like as a pigment, a foil stamping printing method using a metal foil, a thermal transfer method using a metal foil, or the like has been employed.

However, as for a printed surface obtained by using a printing ink containing a gold powder or a silver powder, the average particle diameter of a metal powder used is large; in the range of 10 to 30 μm, and thus matte metallic gloss can be obtained but it is difficult to obtain specular gloss. Meanwhile, in the foil stamping printing method or the thermal transfer method in which a metal foil is used, an adhesive is applied to a printing medium, and a flat and smooth metal foil is pressed thereon, or a recording medium is brought into close contact with a metal foil and heated to thermally fusion-bond the metal foil to the recording medium. Therefore, relatively good gloss can be obtained, but a special apparatus is necessary. Furthermore, the number of steps in the production increases, and pressure or heat is applied during the production steps. Accordingly, the recording medium is limited to, for example, a recording medium that is resistant against heat and deformation.

Recently, a large number of applications of ink jet in printing have been developed. An application thereof is a metallic printing. For example, JP-A-2002-179960 discloses a technique in which a metal coating film is formed on the surfaces of spherical plastic particles, and an ink composition containing the resulting pigment is printed by ink jet printing. However, in order to obtain high metallic gloss, it is necessary that the spherical particles be deformed to be flat so that the surfaces of the spherical particles become smooth. According to this technique, it is necessary to perform a pressing treatment with a roller and a heat treatment at the same time. Accordingly, it is inevitable that an apparatus and a production process are complicated in this respect, and the recording medium is also limited.

Furthermore, JP-A-2003-292836 and JP-A-2003-306625 disclose techniques using an ink composition in which a colloid of a noble metal such as gold or silver is dispersed. However, when the particle diameter of such a noble metal colloid is decreased to several nanometers to several tens of nanometers so as to give a priority to dispersion stability, coloring due to plasmon absorption occurs and metallic gloss for an ink composition cannot be obtained. In such a case, metallic gloss can be obtained by drying a printed surface, and then performing a heat treatment at 150° C. or higher to fusion-bond colloidal particles. On the other hand, when the particle diameter is increased in order to give a priority to metallic gloss, dispersion stability decreases, and thus problems such as aggregation and precipitation inevitably occur. Consequently, the storage life of the ink composition significantly decreases. In addition, obviously, using a noble metal as a material significantly increases the cost of the ink composition, and such an ink composition is used only for a high-value added application, which is disadvantageous in terms of the cost.

Furthermore, regarding a known metallic ink composition, a metallic pigment is mixed with a colorant, and the mixture is used as an ink composition. In this method, the metallic pigment and the colorant are separated from each other during printing, or only the metallic pigment precipitates and aggregates during the storage of the ink composition. Such a problem may result in printing defects such as color loss in which only the colorant is absorbed in a recording medium and only the metallic pigment remains on a surface, and the formation of a non-uniform image having unevenness.

In addition, the method in which a metallic pigment is mixed with a colorant and the resulting mixture is used as an ink composition has a problem that the expression of a metallic color is limited. For example, it is very difficult to express silver using an ink composition prepared by adding a yellow pigment to a metallic pigment so as to express gold. Accordingly, a method in which an ink composition containing only a metallic pigment is combined with a chromatic color ink composition containing any colorant is more preferable because any metallic color can be efficiently expressed in a large number of combinations.

SUMMARY

An advantage of some aspects of the invention is to provide an ink set that can form a printed surface having a metallic gloss with any color tone on a printed matter by focusing an attention to aluminum as a relatively inexpensive metal material, and constituting an ink set including an ink composition having high metallic specular gloss.

The inventors of the invention have conducted intensive studies and found that a printed matter having high specular glossiness, which has not been realized to date, can be obtained by using an oil-based ink composition containing a specific metallic pigment.

In addition, the inventors of the invention found the following: When a dye is used as a colorant, good transparency can be obtained and the generation of diffused light due to irregular reflection can be suppressed, as compared with the case where a pigment is used as a colorant. Accordingly, a dye is more preferably used when a light-transmissive recording medium is used. FIG. 1 shows an example that specifically illustrates this finding. FIG. 1 shows a distribution of the lightness (L* value) of transmitted light in the L*a*b* color system in the case where a solid printing is performed on a transparent film using a dye or pigment of a yellow colorant, and respective approximate a* value and b* value ($\Delta E = \sqrt{(a^*)^2 - (b^*)^2}$) thereof are provided, and $\Delta E = 1.2$. FIG. 1 is a graph showing a profile of the intensity of transmitted light for every 5 degrees in a direction of −80° to +80° when light is incident from a 0° direction. In FIG. 1, the intensity of the transmitted light is plotted with respect to the Y value (lightness) in the XYZ color system and the L* value in the L*a*b* color system. As shown in FIG. 1, in the case where the pigment is used as the colorant, a larger amount of light is diffused in directions other than the 0° direction, which is the incident direction of light, as compared with the case where the dye is used as the colorant. In the case of the pigment, opacity is confirmed even by visual observation, and a whitish color is observed.

On the basis of the above finding, the inventors of the invention have found the following: In order to obtain a printed matter having a metallic gloss of any color tone, an ink set includes an oil-based ink composition containing a specific metallic pigment for forming metallic glossiness and an ink composition for forming the color tone, wherein the ink composition for forming the color tone is an oil-based ink composition containing an oil dye as a colorant or an oil-based ink composition not containing a colorant. In this case, a printed matter having metallic glossiness of any color tone in which the colorant does not interfere with the metallic glossiness and transparency is improved can be formed, as compared with a case where an oil-based ink composition containing a pigment is used. This finding led to the realization of the invention.

According to a first aspect of the invention, an ink set includes an oil-based ink composition containing a metallic pigment; and at least one oil-based ink composition selected from the group consisting of a chromatic color ink composition containing a chromatic color oil dye, a black ink composition containing a black oil dye, and a colorless and transparent ink composition that does not contain a colorant.

Preferably, the ink set further includes a white oil ink composition containing a white pigment.

In the ink set, the metallic pigment is preferably composed of plate-like particles. When the major axis of the plate-like particles in a plane thereof is represented by X, the minor axis thereof is represented by Y, and the thickness thereof is represented by Z, a 50% average particle diameter R50 of an equivalent circle diameter determined by the area of the X-Y plane of the plate-like particles is preferably in the range of 0.5 to 3 μm. Furthermore, the metallic pigment preferably satisfies the relationship R50/Z>5.

The metallic pigment is preferably composed of aluminum or an aluminum alloy.

The metallic pigment is preferably prepared by crushing a metal vapor-deposited film.

Preferably, the oil-based ink composition containing a metallic pigment further contains an organic solvent and a resin.

The oil-based ink composition containing a metallic pigment preferably contains the metallic pigment in an amount in the range of 0.1 to 10.0 mass percent.

The organic solvent preferably contains at least one alkylene glycol ether which is liquid at room temperature and atmospheric pressure.

The organic solvent is preferably a mixture of an alkylene glycol diether, an alkylene glycol monoether, and a lactone.

The resin is preferably at least one selected from the group consisting of polyvinyl butyral, cellulose acetate butyrate, polyacrylic polyols, polyurethanes, vinyl chloride-vinyl acetate copolymers, and resin emulsions thereof.

Preferably, the oil-based ink composition containing a metallic pigment further contains at least one selected from acetylene glycol surfactants and silicone surfactants.

According to a second aspect of the invention, an ink jet recording method includes ejecting droplets of an ink composition to cause the droplets to adhere to a recording medium having an ink-accepting layer, wherein an image is formed using the ink set according to the first aspect of the invention.

In this case, an image may be formed by ejecting the oil-based ink composition containing a metallic pigment, and at least one oil-based ink composition selected from the group consisting of the chromatic color ink composition, the black ink composition, and the colorless and transparent ink composition at the same time.

Alternatively, an image may be formed using the oil-based ink composition containing a metallic pigment, and an image may then be formed using at least one oil-based ink composition selected from the group consisting of the chromatic color ink composition, the black ink composition, and the colorless and transparent ink composition.

Alternatively, an image may be formed using at least one oil-based ink composition selected from the group consisting of the chromatic color ink composition, the black ink composition, and the colorless and transparent ink composition, and an image may then be formed using the oil-based ink composition containing a metallic pigment.

In the method, the recording medium is preferably a visible light-transmissive recording medium.

In the method, printing is preferably performed while heating the recording medium before printing and/or during printing and/or after printing.

In this case, the heating temperature is preferably in the range of 30° C. to 80° C.

A third aspect of the invention provides a recorded matter recorded by the ink jet recording method according to the second aspect of the invention.

According to a fourth aspect of the invention, an ink jet recording apparatus includes the ink set according to the first aspect of the invention.

According to a fifth aspect of the invention, in an image recording method for forming an image using the ink set according to the first aspect of the invention, the method includes a color image-forming step of forming a color image in an ink-accepting layer provided on a visible light-transmissive recording medium using at least one oil-based ink composition selected from the group consisting of the chromatic color ink composition, the black ink composition, and the colorless and transparent ink composition; and a metallic gloss image-forming step of forming a metallic gloss image on a surface of the visible light-transmissive recording medium, the surface opposite the surface having the ink-accepting layer thereon, using the oil-based ink composition containing a metallic pigment.

According to a sixth aspect of the invention, in an image recording method for forming an image using the ink set according to the first aspect of the invention, the method includes a color image-forming step of forming a color image in an ink-accepting layer provided on a visible light-transmissive recording medium using at least one oil-based ink composition selected from the group consisting of the chromatic color ink composition, the black ink composition, and the colorless and transparent ink composition; and a metallic gloss image-forming step of forming a metallic gloss image on a visible light-transmissive or visible light non-transmissive recording medium using the oil-based ink composition containing a metallic pigment, wherein the visible light-transmissive recording medium having the color image thereon and the visible light-transmissive or visible light non-transmissive recording medium having the metallic gloss image thereon are stacked so that the color image and the metallic gloss image are in contact with each other or the color image and the metallic gloss image are disposed, with one of the visible light-transmissive recording media therebetween.

According to an ink set, an ink jet recording method, a recorded matter recorded by the ink jet recording method, and an ink jet recording apparatus according to some aspects of the invention, by using an ink composition containing a metallic pigment, an image having high metallic gloss can be formed on a recording medium. Furthermore, an ink set is constituted by combining the ink composition containing a metallic pigment with at least one oil-based ink composition selected from the group consisting of a chromatic color ink composition containing a chromatic color oil dye, a black ink composition containing a black oil dye, and a colorless and transparent ink composition that does not contain a colorant, thereby forming an image that has not been realized with a known ink set, that is, an image having metallic glossiness of any color tone in which the colorant does not interfere with the metallic glossiness and transparency is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Ink Set

Figure 1:
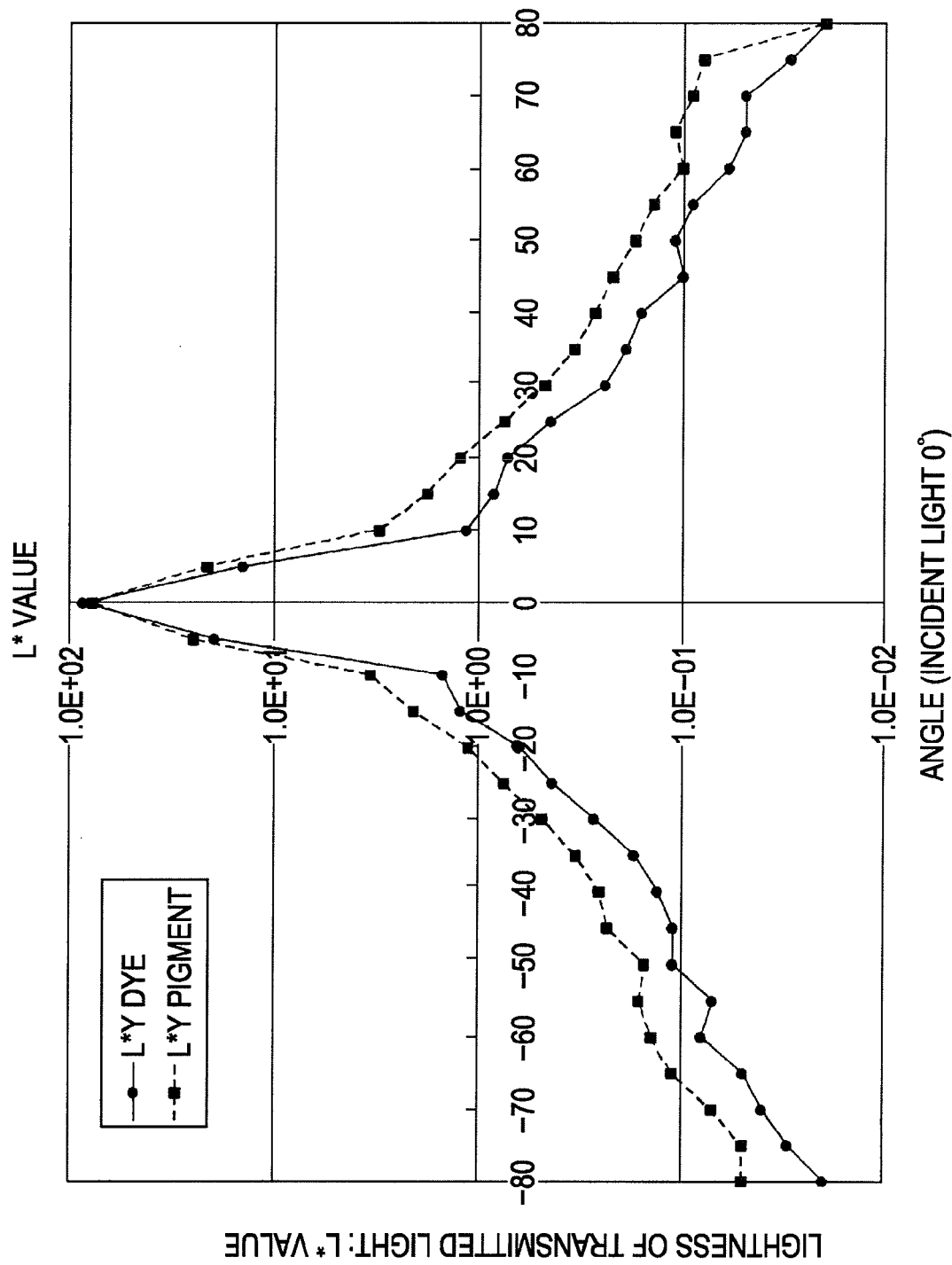
FIG. 1 is a graph showing a profile of the intensity of transmitted light for every 5 degrees in a direction of −80° to +80° when printing is performed using a pigment or a dye and light is incident from a 0° direction, the intensity of the transmitted light being plotted with respect to the Y value (lightness) in the XYZ color system and the L* value in the L*a*b* color system.

As described above, an ink set of the invention includes an oil-based ink composition containing a metallic pigment, and at least one oil-based ink composition selected from the group consisting of a chromatic color ink composition containing a chromatic color oil dye, a black ink composition containing a black oil dye, and a colorless and transparent ink composition that does not contain a colorant. Accordingly, an image to which a metallic gloss is added to color tones of the chromatic color oil dye, the black oil dye, and the colorless and transparent ink can be formed. In particular, since the ink set of the invention includes a dye colorant, the colorant does not interfere with metallic glossiness as compared with a pigment colorant, and an image to which a metallic gloss of any color tone is added and which has high transparency can be formed.

The metallic pigment is composed of plate-like particles. As for the metallic pigment, when the major axis of the plate-like particles in a plane thereof is represented by X, the minor axis thereof is represented by Y, and the thickness thereof is represented by Z, a 50% average particle diameter R50 of an equivalent circle diameter determined by the area of the X-Y plane of the plate-like particles is preferably in the range of 0.5 to 3 μm, and the relationship R50/Z>5 is satisfied. Note that the 50% average particle diameter R50 of the equivalent circle diameter determined by the area of the X-Y plane of the plate-like particles represents a number-average 50% average particle diameter.

The term "plate-like particle" refers to a particle having a substantially flat planar (X-Y plane) shape and a substantially uniform thickness (Z). Since plate-like particles are prepared by crushing a metal vapor-deposited film, metal particles having a substantially flat planar shape and a substantially uniform thickness can be obtained. Accordingly, the major axis of the plate-like particles in the plane thereof, the minor axis thereof, and the thickness thereof can be defined as X, Y, and Z, respectively.

The term "equivalent circle diameter" is the diameter when the substantially flat planar (X-Y plane) shape of a plate-like particle of a metallic pigment is assumed to be a circle having the same projected area as a projected area of the particle of the metallic pigment. For example, when the substantially flat planar (X-Y plane) shape of a plate-like particle of a metallic pigment is a polygon, a projection plane of the polygon is converted to a circle, and the diameter of the circle is referred to as an equivalent circle diameter of the plate-like particle of the metallic pigment.

The 50% average particle diameter R50 of the equivalent circle diameter determined by the area of the X-Y plane of the plate-like particles is preferably in the range of 0.5 to 3 μm, and further preferably in the range of 0.75 to 2 μm from the standpoint of metallic gloss and print stability.

As for the relationship between the 50% average particle diameter R50 of the equivalent circle diameter and the thickness Z, the relationship R50/Z>5 is preferably satisfied from the standpoint that a high metallic gloss is ensured.

From the standpoint of the cost and the standpoint that a metallic gloss is ensured, the metallic pigment is preferably composed of aluminum or an aluminum alloy. When an aluminum alloy is used, other metal elements or non-metal elements that can be added to aluminum are not particularly limited as long as the elements have a metallic gloss. Examples thereof include silver, gold, platinum, nickel, chromium, tin, zinc, indium, titanium, and copper. At least one of these elements, alloys thereof, and mixtures thereof is preferably used.

The metallic pigment is produced by, for example, the following method: First, a composite pigment base material having a structure in which a resin layer for detachment and a metal or alloy layer are sequentially laminated on a sheet-like substrate is prepared. The metal or alloy layer is detached from the sheet-like substrate at a boundary of an interface between the metal or alloy layer and the resin layer for detachment, and the detached metal or alloy layer is then crushed to form small particles. Thus, plate-like particles are obtained. Subsequently, when the major axis of the resulting plate-like particles in a plane thereof, the minor axis thereof, and the thickness thereof are defined as X, Y, and Z, respectively, particles that have a 50% average particle diameter R50 of the equivalent circle diameter determined by the area of the X-Y plane of the plate-like particles in the range of 0.5 to 3 μm and that satisfy the relationship R50/Z>5 are collected.

The major axis X, the minor axis Y, and the equivalent circle diameter of the metallic pigment (plate-like particle) in a plane thereof can be measured with a particle image analyzer. As such a particle image analyzer, for example, a flow particle image analyzer FPIA-2100, FPIA-3000, or FPIA-3000S manufactured by Sysmex Corporation can be used.

The above-mentioned metal or alloy layer is preferably formed by vacuum evaporation, ion plating, or a sputtering method.

The metal or alloy layer is formed so as to have a thickness of 20 nm or more and 100 nm or less. Consequently, a pigment having an average thickness of 20 nm or more and 100 nm or less is obtained. By controlling the thickness to be 20 nm or more, the resulting pigments has good reflectivity and brightness and thus has a high performance of a metallic pigment. By controlling the thickness to be 100 nm or less, an increase in the apparent specific gravity is suppressed, and dispersion stability of the metallic pigment can be ensured.

The resin layer for detachment in the composite pigment base material, which is an undercoat layer of the metal or alloy layer, is a layer with detachability for improving detachability from a surface of the sheet-like substrate. Preferable examples of a resin used in this resin layer for detachment include polyvinyl alcohol, polyvinyl butyral, polyethylene glycol, polyacrylic acid, polyacrylamide, cellulose derivatives, acrylic acid polymers, and modified nylon resins.

A solution of one of the above resins or a mixture containing two or more of the above resins is applied onto a sheet-like substrate, and drying or the like is performed to form a layer. An additive such as a viscosity modifier may be incorporated in the application solution.

The resin layer for detachment is formed by a generally used application method such as gravure application, roll application, blade application, extrusion application, dip application, or a spin-coating method. After the application and drying, the surface is planarized by a calender treatment as required.

The thickness of the resin layer for detachment is not particularly limited, but preferably in the range of 0.5 to 50 μm, and more preferably in the range of 1 to 10 μm. If the thickness is less than 0.5 μm, the amount of resin functioning as a dispersion resin is insufficient. If the thickness exceeds 50 μm, in the case where the resin layer is formed into a roll, the resin layer is liable to detach from a pigment layer at the interface.

Examples of a material of the sheet-like substrate include, but are not limited to, detachable films such as polytetrafluoroethylene, polyethylene, polypropylene, polyester films, e.g., polyethylene terephthalate, polyamide films, e.g., 66 nylon and 6 nylon, a polycarbonate film, a triacetate film, and polyimide films. The sheet-like substrate is preferably composed of polyethylene terephthalate or a copolymer thereof.

The thickness of the sheet-like substrate is not particularly limited, but preferably in the range of 10 to 150 μm. When the thickness is 10 μm or more, problems do not occur in terms of handleability in producing steps or the like. When the thickness is 150 μm or less, the sheet-like substrate has sufficient flexibility, and problems do not occur in terms of a formation of a roll, detachment, and the like.

As exemplified in JP-A-2005-68250, the metal or alloy layer may be sandwiched between protective layers. Examples of the protective layers include a silicon oxide layer and a resin layer for protection.

The silicon oxide layer is not particularly limited as long as the layer contains silicon oxide. The silicon oxide layer is preferably formed from a silicon alkoxide such as tetraalkoxysilane or a polymer thereof by a sol-gel method.

An alcohol solution prepared by dissolving the silicon alkoxide or a polymer thereof is applied and baked by heating to form a silicon oxide coating layer.

The resin layer for protection is not particularly limited as long as a resin that is insoluble in a dispersion medium is used. Examples of the resin include polyvinyl alcohol, polyethylene glycol, polyacrylic acid, polyacrylamide, and cellulose derivatives. The resin layer for protection is preferably formed of polyvinyl alcohol or a cellulose derivative.

An aqueous solution of one of the above resins or a mixture containing two or more of the above resins is applied, and drying or the like is performed to form a layer. An additive such as a viscosity modifier may be incorporated in the application solution.

The application of silicon oxide or the resin is performed by the same method as the application of the resin layer for detachment described above.

The thickness of the protective layer is not particularly limited, but preferably in the range of 50 to 150 nm. If the thickness is less than 50 nm, the mechanical strength is insufficient. If the thickness exceeds 150 nm, the strength becomes too high, and therefore it is difficult to perform crushing and dispersion and the protective layer may be detached at the interface with the metal or alloy layer.

Furthermore, a colorant layer may be provided between the protective layer and the metal or alloy layer.

The colorant layer is provided in order to obtain any colored composite pigment. The colorant layer is not particularly limited as long as the colorant layer can contain a colorant that can impart any color tone and hue in addition to the metallic gloss and brightness of the metallic pigment used in the invention. The colorant used in this colorant layer may be either a dye or a pigment. Known dyes and pigments may be appropriately used as the colorant.

In this case, the term "pigment" used in the colorant layer means a natural pigment, a synthetic organic pigment, a synthetic inorganic pigment, or the like as defined in the field of general pigment chemistry and differs from a pigment that is processed into a laminated structure, for example, the "composite pigment" of the invention.

A method of forming the colorant layer is not particularly limited, but the colorant layer is preferably formed by coating.

When the colorant used in the colorant layer is a pigment, preferably, a resin for dispersing the colorant is further incorporated. The resin for dispersing the colorant is preferably incorporated as follows in the form of a resin thin film: The pigment, the resin for dispersing the colorant, as required, other additives, and the like are dispersed or dissolved in a solvent to form a solution. A uniform liquid film is formed by coating the solution and then dried to form a resin thin film.

Note that, in the production of the composite pigment base material, both the colorant layer and the protective layer are preferably formed by coating in terms of operation efficiency.

The composite pigment base material may have a layer configuration including a plurality of sequential laminated structure of the resin layer for detachment and the metal or alloy layer. In such a case, the total thickness of the laminated structure including a plurality of metal or alloy layers, that is, the thickness of metal or alloy layer/resin layer for detachment/metal or alloy layer, or resin layer for detachment/metal or alloy layer excluding the sheet-like substrate and the resin layer for detachment disposed directly on the substrate is preferably 5,000 nm or less. When the thickness is 5,000 nm or less, even when the composite pigment base material is rounded to form a roll, cracking or detachment does not readily occur and the composite pigment base material can have satisfactory storage stability. In addition, when the composite pigment base material is formed into a pigment, the resulting pigment has good brightness, which is preferable.

Alternatively, the resin layer for detachment and the metal or alloy layer may be sequentially laminated on both surfaces of the sheet-like substrate. However, the structure of the composite pigment base material is not limited thereto.

A method of detaching from the sheet-like substrate is not particularly limited. However, preferable examples of the method include a method in which the composite pigment base material is immersed in a liquid, and a method in which the composite pigment base material is immersed in a liquid and an ultrasonic treatment is performed at the same time to perform a detachment treatment and a crushing treatment of the detached composite pigment.

According to the pigment obtained as described above, the resin layer for detachment has a function of a protective colloid, and a stable dispersion liquid of the pigment can be prepared only by performing a dispersion treatment in a solvent. Furthermore, in an ink composition containing the pigment, the resin derived from the resin layer for detachment also has a function of imparting adhesiveness to a recording medium such as paper.

An oil-based ink composition used in the ink set of the invention contains the metallic pigment described above, an organic solvent, and a resin.

The concentration of the metallic pigment in the ink composition is preferably in the range of 0.1 to 10.0 mass percent.

When the concentration of the metallic pigment in the ink composition is 0.1 mass percent or more and less than 1.5 mass percent, the following printing can be realized: By ejecting an ink in an amount with which a printing surface is not sufficiently covered, a half-mirror-like glossy surface, more specifically, a texture in which glossiness can be provided but the background is also seen through the glossiness can be formed. By ejecting an ink in an amount with which a printing surface is sufficiently covered, a metallic highly glossy surface can be formed. Therefore, such an ink composition is suitably used, for example, when a half-mirror image is formed on a transparent recording medium or when a metallic highly glossy surface is expressed. When the concentration of the metallic pigment in the ink composition is 1.5 mass percent or more and 3.0 mass percent or less, the metallic pigment is arranged on a printing surface at random, and thus high glossiness is not obtained and matte metallic glossy surface can be formed. Therefore, such an ink composition is suitably used, for example, when a shielding layer is formed on a transparent recording medium.

Preferable examples of the organic solvent that can be used include polar organic solvents such as alcohols (e.g., methyl alcohol, ethyl alcohol, propyl alcohol, butyl alcohol, isopropyl alcohol, and fluorinated alcohols); ketones such as (acetone, methyl ethyl ketone, and cyclohexanone); carboxylic acid esters (e.g., methyl acetate, ethyl acetate, propyl acetate, butyl acetate, methyl propionate, and ethyl propionate); and ethers (e.g., diethyl ether, dipropyl ether, tetrahydrofuran, and dioxane).

In particular, the organic solvent preferably contains one or more alkylene glycol ethers which are liquid at room temperature and atmospheric pressure.

Alkylene glycol ethers include ethylene glycol ethers and propylene glycol ethers based on aliphatic groups, such as methyl, n-propyl, i-propyl, n-butyl, i-butyl, hexyl, and 2-ethylhexyl groups; an allyl group, which have a double bond; and a phenyl group. Such alkylene glycol ethers have no color and little odor, have properties of both an alcohol and an ether because of an ether group and a hydroxyl group in their molecules, and are liquid at room temperature. These ethers are divided into monoethers, in which one of the hydroxyl groups is substituted, and diethers, in which the two hydroxyl groups are substituted. A plurality of these ethers may be used in combinations.

In particular, the organic solvent is preferably a mixture of an alkylene glycol diether, an alkylene glycol monoether, and a lactone.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Examples of the lactone include γ-butyrolactone, δ-valerolactone, and ε-caprolactone.

According to such a preferable configuration, the advantage of some aspects of the invention can be more effectively achieved.

Examples of the resin used in the oil-based ink composition include acrylic resins, styrene-acrylic resins, rosin-modified resins, terpene resins, polyester resins, polyamide resins, epoxy resins, vinyl chloride resins, vinyl chloride-vinyl acetate copolymers, cellulose resins (e.g., cellulose acetate butyrate and hydroxypropyl cellulose), polyvinyl butyral, polyacrylic polyols, polyvinyl alcohol, and polyurethanes.

Non-aqueous emulsion of polymer fine particles (non-aqueous dispersion (NAD)) may also be used as the resin. The non-aqueous dispersion (NAD) is a dispersion liquid in which fine particles composed of a polyurethane resin, an acrylic resin, an acrylic polyol resin, or the like are stably dispersed in an organic solvent. Examples of the polyurethane resin include Sanprene IB-501 and Sanprene IB-F370, manufactured by Sanyo Chemical Industries, Ltd. An example of the acrylic polyol resin is N-2043-60MEX manufactured by Harima Chemicals, Inc.

In order to further improve an adhesion property of the pigment to a recording medium, the resin emulsion is preferably added to the ink composition in an amount of 0.1 mass percent or more and 10 mass percent or less. If the amount added is too large, print stability is not provided. If the amount added is too small, the adhesion property is insufficient.

In particular, the resin is preferably at least one selected from the group consisting of polyvinyl butyral, cellulose acetate butyrate, polyacrylic polyols, polyurethanes, vinyl chloride-vinyl acetate copolymers, and resin emulsions thereof.

The ink composition preferably contains at least one of glycerol, polyalkylene glycols, and saccharides. The total amount of at least one of glycerol, polyalkylene glycols, and saccharides in the ink composition is preferably 0.1 mass percent or more and 10 mass percent or less.

According to such a preferable configuration, ejection of ink can be stabilized while suppressing drying of the ink and preventing clogging, thus realizing a satisfactory image quality of a recorded matter.

Polyalkylene glycols are linear polymer compounds having a repeated structure of ether bonds in their main chains and are produced by, for example, ring-opening polymerization of cyclic ethers.

Specific examples of the polyalkylene glycol include polymers such as polyethylene glycol and polypropylene glycol; ethylene oxide-propylene oxide copolymers; and derivatives thereof. Any type of copolymer such as a random copolymer, a block copolymer, a graft copolymer, or an alternating copolymer can be used.

A preferred specific example of the polyalkylene glycol is represented by the following formula:

$$HO-(C_nH_{2n}O)_m-H$$

(wherein n represents an integer of 1 to 5 and m represents an integer of 1 to 100).

In $(C_nH_{2n}O)_m$ of the above formula, the integer n may be either a single constant or a combination of two or more constants within the above range. For example, when n is 3, the formula gives $(C_3H_6O)_m$, and when n is a combination of 1 and 4, the formula gives $(CH_2O-C_4H_8O)_m$. Also, the integer m may be either a single constant or a combination of two or more constants within the above range. For example, when m is a combination of 20 and 40 in the above example, the formula gives $(CH_2O)_{20}-(C_4H_8O)_{40}$, and when m is a combination of 10 and 30, the formula gives $(CH_2O)_{10}-(C_4H_8O)_{30}$. Furthermore, any combination of the integers n and m may be selected within the above ranges.

Examples of the saccharides include monosaccharides such as pentoses, hexoses, heptoses, and octoses; polysaccharides such as disaccharides, trisaccharides, and tetrasaccharides; and derivatives thereof such as reduced derivatives, e.g., as sugar alcohols and deoxy sugars, oxidized derivatives, e.g., aldonic acids and uronic acids, dehydrated derivatives, e.g., glycoseens; amino sugars, and thio sugars. The term "polysaccharides" refers to sugars in a broad sense, and polysaccharides include widely naturally occurring substances such as alginic acid, dextrin, and cellulose.

The oil-based ink composition preferably contains at least one selected from acetylene glycol surfactants and silicone surfactants. The surfactant is preferably added in an amount of 0.01 mass percent or more and 10 mass percent or less of the content of the pigment in the ink composition.

According to such a preferable configuration, wettability of the oil-based ink composition on a recording medium can be improved, thus realizing a quick adhesion property.

Preferred examples of the acetylene glycol surfactants include Surfynol 465 (trademark) and Surfynol 104 (trademark) (trade names, manufactured by Air Products and Chemicals, Inc.) and Olfine STG (trademark) and Olfine E1010 (trademark) (trade names, manufactured by Nissin Chemical Industry Co., Ltd.).

As the silicone surfactant, polyester-modified silicone or polyether-modified silicone is preferably used. Specific examples of the silicone surfactants include BYK-347, BYK-348, BYK-UV3500, BYK-UV3510, BYK-UV3530, and BYK-UV3570 (manufactured by BYK Japan K.K.).

The oil-based ink composition can be prepared by a commonly used method. For example, first, the metallic pigment, a dispersant, and the solvent are mixed, and a pigment dispersion liquid is then prepared using a ball mill, a bead mill, ultrasonic waves, a jet mill, or the like so that the pigment dispersion liquid has desired ink properties. Subsequently, a binder resin, the solvent, and other additives (such as a dispersion aid and a viscosity modifier) are added under stirring. Thus, the pigment ink composition can be obtained.

Alternatively, the composite pigment base material may be subjected to an ultrasonic treatment in a solvent to prepare a composite pigment dispersion liquid, and the composite pigment dispersion liquid may then be mixed with a desired solvent for ink. Alternatively, the composite pigment base material may be subjected to an ultrasonic treatment directly in a solvent for ink to prepare the ink composition without further treatment.

Although the physical properties of the oil-based ink composition are not particularly limited, for example, the oil-based ink composition preferably has a surface tension of 20 to 50 mN/m. If the surface tension is less than 20 mN/m, it may be difficult to eject ink droplets because the ink composition wets and spreads on the surface of a head of an ink jet recording printer or exudes on the surface. If the surface tension exceeds 50 mN/m, satisfactory printing may not be performed because the ink composition does not wet and spread on the surface of a recording medium.

Next, a description will be made of color oil-based ink compositions, i.e., a chromatic color ink composition, a black ink composition, and a colorless and transparent ink composition that does not contain a colorant, all of which are used in an ink set of the invention. The term "chromatic color" refers to any color other than a series of colors ranging from white to black through gray (achromatic colors).

Each of the chromatic color ink composition and the black ink composition contains an oil dye (i.e., oil-soluble dye) as a colorant. The oil dye that can be used in the invention refers to a dye that is satisfactorily dissolved in liquid compounds other then water and that is substantially insoluble in water under an environment of room temperature and atmospheric pressure. Oil dyes having a solubility to water (the weight of a dye that is soluble in 100 g of water) at 25° C. of 1 g or less can be used. The molecules of such an oil dye are dissolved in the ink composition to form a single molecule or a very small aggregate (having a diameter of about several tens of nanometers) in which several molecules gather together.

Specific examples of chromatic color oil dyes will be described below. In the description of specific examples below, the oil dyes are broadly classified into blue dyes, red dyes, and yellow dyes. Medium color dyes, namely, green dyes and violet dyes will also be described in the groups of the above classification. Examples of the blue oil dyes include indoaniline dyes; indophenol dyes; azomethine dyes containing a pyrrolotriazole derivative as a coupling component; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl dyes and heterylazo dyes all of which contain a phenol derivative, a naphthol derivative, or an aniline derivative as a coupling component; and indigo/thioindigo dyes. Specific examples of the blue oil dyes include Macrolex Blue RR and FR (manufactured by Bayer), Sumiplast Green G (manufactured by Sumitomo Chemical Co., Ltd.), Vali Fast Blue 2606, Oil Blue BOS (manufactured by Orient Chemical Industries Ltd.), Aizen Spilon Blue GNH (manufactured by Hodogaya Chemical Co., Ltd.), Neopen Blue 808, Neopen Blue FF4012, Neopen Cyan FF4238 (manufactured by BASF Ltd.), Oil Violet #730 (manufactured by Orient Chemical Industries Ltd.), C.I. Solvent Blue-2, -11, -25, -35, -38, -43, -67, -70, and -134, C.I. Solvent Green-1, -3, -7, -20, and -33, and C.I. Solvent Violet-2, -3, -11, and -47.

Examples of the red oil dyes include aryl dyes and heterylazo dyes all of which contain a phenol derivative, a naphthol derivative, or an aniline derivative as a coupling component; azomethine dyes containing a pyrazolone derivative or a pyrazolotriazole derivative as a coupling component; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinone, anthraquinone, and anthrapyridone; and fused polycyclic dyes such as dioxazine dyes. Specific examples of the red oil dyes include Oil Red 5303 (manufactured by Arimoto Chemical Co., Ltd.), Oil Red 5B, Oil Pink 312, Oil Scarlet 308 (manufactured by Orient Chemical Industries Ltd.), Oil Red XO (manufactured by Kanto Chemical Co., Inc.), Neopen Magenta SE1378 (manufactured by BASF Ltd.), Oil Brown GR (manufactured by Orient Chemical Industries Ltd.); C.I. Solvent Red-1, -3, -8, -18, -24, -27, -43, -49, -51, -72, -73, -109, -111, -229, -122, -132, and -219; C.I. Solvent Brown-1, -12, and -58; and ORACET RED BG (manufactured by Ciba Specialty Chemicals Inc.).

Examples of the yellow oil dyes include aryl dyes and heterylazo dyes all of which contain a phenol derivative, a naphthol derivative, an aniline derivative, a pyrazolone derivative, a pyridone derivative, or an open-chain active methylene compound as a coupling component. Examples thereof further include methine dyes such as azomethine dyes, benzylidene dyes, and monomethine oxonol dyes, and quinone dyes such as naphthoquinone dyes and anthraquinone dyes all of which contain an open-chain active methylene compound as a coupling agent. Furthermore, examples of yellow dyes other than the above dyes include quinophthalone dyes, nitro/nitroso dyes, acridine dyes, and acridinone dyes. Specific examples of the yellow oil dyes include Oil Yellow 3G, Oil Yellow 129, Oil Yellow 105 (manufactured by Orient Chemical Industries Ltd.), Fast Orange G, Neopen Yellow 075 (manufactured by BASF Ltd.), ORACET YELLOW 3GN (manufactured by Ciba Specialty Chemicals Inc.), C.I. Solvent Yellow-1, -14, -16, -19, -25:1, -29, -30, -56, -82, -93, -162, and -172, and C.I. Solvent Orange-1, -2, -40:1, and -99.

Two or more of the above-mentioned dyes may be incorporated in combinations in the ink composition. When a plurality of dyes are used in combination, some combinations may form achromatic colors.

Specific examples of the black oil dye will be described below. Specific examples of the black dye include Sudan Black X60 (manufactured by BASF Ltd.), Nubian Black PC-0850, Oil Black HBB (manufactured by Orient Chemical Industries Ltd.), and C.I. Solvent Black-3, -7, -22:1, -27, -29, -34, and -50. Furthermore, the chromatic color ink composition may further contain a black dye in order to, for example, adjust the lightness of the color of a chromatic color oil dye.

The content of the dye contained in the chromatic color ink composition and the black ink composition is preferably in the range of 0.1 to 25 mass percent, and more preferably in the range of 0.5 to 15 mass percent.

The colorless and transparent ink composition that does not contain a colorant (clear ink) has the same composition as the above chromatic color ink composition except that the colorless and transparent ink composition does not contain a colorant. Specifically, the colorless and transparent ink composition contains a solvent and an adhesion resin component. The use of the colorless and transparent cleat ink can impart a function of protecting a metallic glossy surface formed by an adhesion of a metallic pigment.

The chromatic color ink composition, the black ink composition, and the clear ink may contain, as other components, known wetting agents, penetrants, pH adjusters, preservatives, fungicides, and the like. Furthermore, leveling additives, matte agents, and polyester resins, polyurethane resins, vinyl resins, acrylic resins, rubber resins, and waxes for adjusting physical properties of a recorded matter may be optionally added.

The chromatic color ink composition, the black ink composition, and the clear ink can be prepared by a known, commonly used method.

The ink set of the invention may include a white oil-based ink composition containing a white pigment as long as the advantages of the invention is not impaired. By adding the white oil-based ink composition to the ink set, a matte texture can be partly provided to a metallic glossy surface.

Examples of the white pigment include oxides of a Group IV element such as titanium dioxide and zirconium dioxide. Examples thereof further include calcium carbonate, calcium sulfate, zinc oxide, barium sulfate, barium carbonate, silica, alumina, kaolin, clay, talc, white earth, aluminum hydroxide, magnesium carbonate, and a white hollow resin emulsion. Preferably, these white pigments are used alone or as a mixture of two or more pigments selected from the group consisting of these pigments.

Hollow resin emulsions are oil-based dispersion liquids containing hollow polymer fine particles, wherein the hollow polymer fine particles are composed of a plurality of fine particle subgroups, and regarding the average particle size, a difference in the average particle diameter between fine particle subgroups adjacent to each other is less than 100 nm.

The white pigment has a primary particle diameter preferably in the range of 0.02 to 1 µm, and more preferably in the range of 0.05 to 0.8 µm in terms of whiteness. If the average particle diameter of the white pigment particles exceeds 1 µm, for example, the white pigment particles may be precipitated, thereby impairing the dispersion stability. On the other hand, if the average particle diameter is less than 0.02 µm, the whiteness tends to be insufficient.

Herein, the term "primary particle diameter" refers to the size of a particle composed of aggregated single crystals or crystallites equivalent thereto. The primary particle diameter of a pigment is measured by electron microscopy. In this method, the size of particles of the pigment is measured using an electron micrograph. A more reliable value can be determined by dispersing the pigment in an organic solvent, immobilizing the pigment on a support film, and measuring the primary particle diameter from a transmission electron micrograph after image processing. More specifically, the primary particle diameter is determined by measuring the minor axis and the major axis of the primary particles, calculating the diameters of circles having the same areas as the primary particles as the primary particle diameters, and averaging the primary particle diameters of 50 or more pigment particles selected at random from a predetermined field of view. Any other method may be employed as long as equivalent reliability is obtained, but the value determined by the method described above is used if there is any substantial difference in measured values.

The content of the pigment in the white oil-based ink composition is preferably 1.0 mass percent or more, more preferably 5.0 mass percent or more, and further preferably 10 mass percent or more and 20 mass percent or less in terms of whiteness.

In addition to the pigment used as a colorant, the white oil-based ink composition preferably contains a dispersant for dispersing the pigment. Any dispersant that can be used for this type of pigment ink can be used without particular limitations. Examples of the dispersant include cationic dispersants, anionic dispersants, nonionic dispersant, and surfactants.

Examples of the anionic dispersant include polyacrylic acid, polymethacrylic acid, acrylic acid-acrylonitrile copolymers, vinyl acetate-acrylate copolymers, acrylic acid-alkyl acrylate copolymers, styrene-acrylic acid copolymers, styrene-methacrylic acid copolymers, styrene-acrylic acid-alkyl acrylate copolymers, styrene-methacrylic acid-alkyl acrylate copolymers, styrene-α-methylstyrene-acrylic acid copolymers, styrene-α-methylstyrene-acrylic acid-alkyl acrylate copolymers, styrene-maleic acid copolymers, vinylnaphthalene-maleic acid copolymers, vinyl acetate-ethylene copolymers, vinyl acetate-fatty acid vinylethylene copolymers, vinyl acetate-maleate copolymers, vinyl acetate-crotonic acid copolymers, and vinyl acetate-acrylic acid copolymers.

Examples of the nonionic dispersant include polyvinylpyrrolidone, polypropylene glycol, and vinylpyrrolidone-vinyl acetate copolymers.

Examples of the surfactant used as a dispersant include anionic surfactants such as sodium dodecylbenzenesulfonate, sodium laurate, and ammonium salts of polyoxyethylene alkyl ether sulfate; and nonionic surfactants such as polyoxyethylene alkyl ethers, polyoxyethylene alkyl esters, polyoxyethylene sorbitan fatty acid esters, polyoxyethylene alkylphenyl ethers, polyoxyethylene alkylamines, and polyoxyethylene alkylamides. In particular, styrene-(meth) acrylic acid copolymers are preferably used from the standpoint of enhancing dispersion stability of the pigment.

In the white oil-based ink composition, the same organic solvents, adhesion resin components, surfactants, and the like as those used in the above-described oil-based ink composition containing a metallic pigment can be used as additives. The white oil-based ink composition may further contain other additives contained in typical oil-based ink compositions. Examples of the additives include stabilizers such as an antioxidant and an ultraviolet absorber.

Examples of the antioxidant that can be used include 2,3-butyl-4-oxyanisole (BHA) and 2,6-di-tert-butyl-p-cresol (BHT). Examples of the ultraviolet absorber that can be used include benzophenone compounds and benzotriazole compounds.

The white oil-based ink composition can be prepared by a known, commonly used method.

Ink Jet Recording Method

According to an ink jet recording method of the invention, an ink jet recording method including ejecting droplets of an ink composition by driving an ink jet head to cause the droplets to adhere to a recording medium, wherein an image is formed using the above-described ink set.

When the oil-based ink composition containing the above-mentioned metal pigment is used alone, it is possible to form images having a metallic gloss for which the measured values of specular glossiness at angles of 20 degrees, 60 degrees, and 85 degrees specified in JIS Z8741 are 200 or more, 200 or more, and 100 or more, respectively, at the same time. By appropriately combining such images from the standpoint of angular dependency, images having a desired metallic gloss, i.e., from a matte image to a glossy image, can be formed by using the oil-based ink composition.

More specifically, an image with a delustered (matte) metallic gloss can be formed when the measured values of specular glossiness at angles of 20 degrees, 60 degrees, and 85 degrees, which are specified in JIS Z8741, are 200 or more and less than 400, 200 or more and less than 400, and 100 or more, respectively, at the same time.

In addition, a metallic gloss image on which a reflection of an object can be slightly seen can be formed when the measured values of specular glossiness at angles of 20 degrees, 60 degrees, and 85 degrees, which are specified in JIS Z8741, are 400 or more and less than 600, 400 or more and less than 600, and 100 or more, respectively, at the same time.

Furthermore, a sharp, metallic gloss image on which a reflection of an object can be clearly seen, namely, a specular gloss image, can be formed when the measured values of specular glossiness at angles of 20 degrees, 60 degrees, and 85 degrees, which are specified in JIS Z8741, are 600 or more, 600 or more, and 100 or more, respectively, at the same time.

In contrast, in the case where the measured values of specular glossiness at angles of 20 degrees, 60 degrees, and 85 degrees are less than 200, less than 200, and less than 100, respectively, when such an image is visually observed, a metallic gloss is not provided and the color of the image is observed as gray. In addition, in the case where any of the measured values of specular glossiness at angles of 20 degrees, 60 degrees, and 85 degrees is less than the above specified value, the above-described metallic images cannot be obtained.

The amount of ink composition ejected onto the recording medium is preferably in the range of 0.1 to 100 mg/cm$^2$, and more preferably 1.0 to 50 mg/cm$^2$ from the standpoint that a metallic gloss is ensured and from the standpoints of the printing process and the cost.

The dry weight of the metallic pigment forming an image on the recording medium is preferably in the range of 0.0001 to 3.0 mg/cm$^2$ from the standpoints of the metallic gloss, the printing process, and the cost. A metallic glossy surface with high glossiness can be formed with a smaller dry weight of the metallic pigment. Accordingly, for example, this is suitable for a case where a half-mirror image is formed on a visible light-transmissive recording medium. A matte metallic glossy surface can be formed with a lager dry weight of the metallic pigment. Accordingly, for example, this is suitable for a case where a shielding layer is formed on a visible light-transmissive recording medium.

The oil-based ink composition containing a metallic pigment, and the oil-based ink composition (hereinafter also referred to as "oil-based ink composition for forming a color image") containing the chromatic color ink composition, the black ink composition, and the colorless and transparent ink composition that does not contain a colorant may be ejected at the same time to form an image. Accordingly, a metallic gloss can be imparted to a chromatic color oil dye, a black oil dye, and a colorless and transparent color tone.

Alternatively, the oil-based ink composition containing a metallic pigment and the oil-based ink composition for forming a color image may be separately ejected. In such a case, for example, an image having a metallic gloss may be formed using the oil-based ink composition containing a metallic pigment and an image may then be formed using the oil-based ink composition for forming a color image. Alternatively, an image may be formed using the oil-based ink composition for forming a color image and an image having a metallic gloss may then be formed using the oil-based ink composition containing a metallic pigment.

Figure 2:
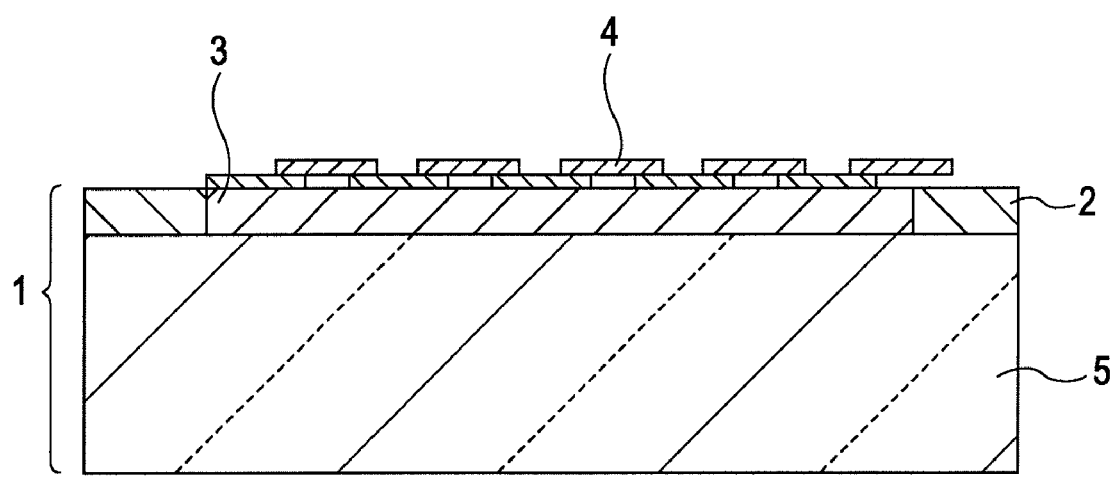
FIG. 2 is a schematic cross-sectional view of a recorded matter obtained by forming an image on a visible light-transmissive recording medium having an ink-accepting layer using an ink set of the invention.

The metallic pigment does not readily permeate an ink-accepting layer on a recording medium regardless of the presence or absence of an ink-accepting layer on the recording medium, and therefore remains adhered to the recording medium. In contrast, when the oil-based ink composition for forming a color image is ejected onto a recording medium having an ink-accepting layer thereon, the dyes contained in the ink composition easily permeate the ink-accepting layer. Accordingly, even when an image having a metallic gloss is formed using the oil-based ink composition containing a metallic pigment and an image is then formed using the oil-based ink composition for forming a color image, the dyes in the oil-based ink composition for forming a color image permeate the ink-accepting layer, and a metallic gloss image with any color tone can be obtained. FIG. 2 is a schematic cross-sectional view of a recorded matter obtained by forming an image on a visible light-transmissive recording medium having an ink-accepting layer using an ink set of the invention. By using a visible light-transmissive recording medium 1 having an ink-accepting layer 2, a metallic gloss image with any color tone can be obtained while a dye 3, which is a colorant, does not interfere with a metallic gloss of a metallic pigment-adhering layer 4 functioning as an underlying layer, when an observation surface is the film layer 5 side of the visible light-transmissive recording medium 1. (In this method of forming an image, the image can be observed from the side opposite the printed surface.) In this case, the oil-based ink composition containing a metallic pigment and the oil-based ink composition for forming a color image may be ejected at the same time. Alternatively, an image having a metallic gloss may be formed using the oil-based ink composition containing a metallic pigment and an image may then be formed using the oil-based ink composition for forming a color image. Alternatively, an image may be formed using the oil-based ink composition for forming a color image and an image having a metallic gloss may then be formed using the oil-based ink composition containing a metallic pigment. On the other hand, in the case where a recording medium not having an ink-accepting layer is used, a metallic gloss image with any color tone can be obtained by the method in which an image having a metallic gloss is formed using the oil-based ink composition containing a metallic pigment and an image is then formed using the oil-based ink composition for forming a color image.

Examples of a method of ejecting an ink composition include the following methods.

A first method is an electrostatic attraction method. In this method, a strong electric field is applied between a nozzle and an accelerating electrode placed in front of the nozzle to successively eject an ink from the nozzle in the form of droplets, and a printing information signal is supplied to deflection electrodes while the ink droplets travels between the deflection electrodes to conduct recording, or the ink droplets are ejected so as to correspond to the printing information signal without deflecting the ink droplets.

In a second method, ink droplets are forcibly ejected by applying a pressure to a liquid ink using a small pump and mechanically vibrating a nozzle using a quartz oscillator or the like. The ejected ink droplets are simultaneously charged during ejection, and a printing information signal is supplied to deflection electrodes while the ink droplets travels between the deflection electrodes to conduct recording.

A third method is a method using a piezoelectric element (piezo element). In this method, a pressure and a printing information signal are simultaneously applied to a liquid ink using the piezoelectric element to eject and record ink droplets.

A fourth method is a method in which the volume of a liquid ink is rapidly expanded by an action of thermal energy. In this method, a liquid ink is foamed by heating using a microelectrode in accordance with a printing information signal to eject and record ink droplets.

Any of the above methods can be employed as the ink jet recording method of the invention. However, from the standpoint of a high-speed printing, the method of ejecting an ink composition is preferably a method without heating. That is, the first method, the second method, or the third method is preferably employed.

Examples of the recording medium include, but are not particularly limited to, various visible light-transmissive or visible light non-transmissive recording media such as plain paper, ink jet printing paper (matte paper and gloss paper), glass, a film of a plastic such as vinyl chloride, a film in which a base material is coated with a plastic or an ink-accepting layer, a metal, and a printed wiring substrate. Examples of the ink-accepting layer include, but are not particularly limited to, an acrylic resins and styrene-acrylic resins.

When the recording medium has an ink-accepting layer, printing is preferably conducted without heating the recording medium from the standpoint of avoiding thermal damage of the ink-accepting layer.

On the other hand, when the recording medium does not have an ink-accepting layer, printing is preferably conducted while heating the recording medium from the standpoints of increasing the drying speed and obtaining high gloss.

The heating may be performed with a heat source being in contact with a recording medium, or with a heat source not being in contact with a recording medium, for example, irradiating the recording medium with infrared rays or microwaves (electromagnetic waves having a maximum wavelength of approximately 2,450 MHz) or blowing hot air to the recording medium.

The heating is preferably performed before printing and/or during printing and/or after printing. That is, the heating of the recording medium may be performed before printing, during printing, after printing, or during the entire printing process. The heating temperature is determined depending on the type of recording medium, and is preferably in the range of 30° C. to 80° C. and more preferably in the range of 40° C. to 60° C.

Recording Apparatus

Figure 3:
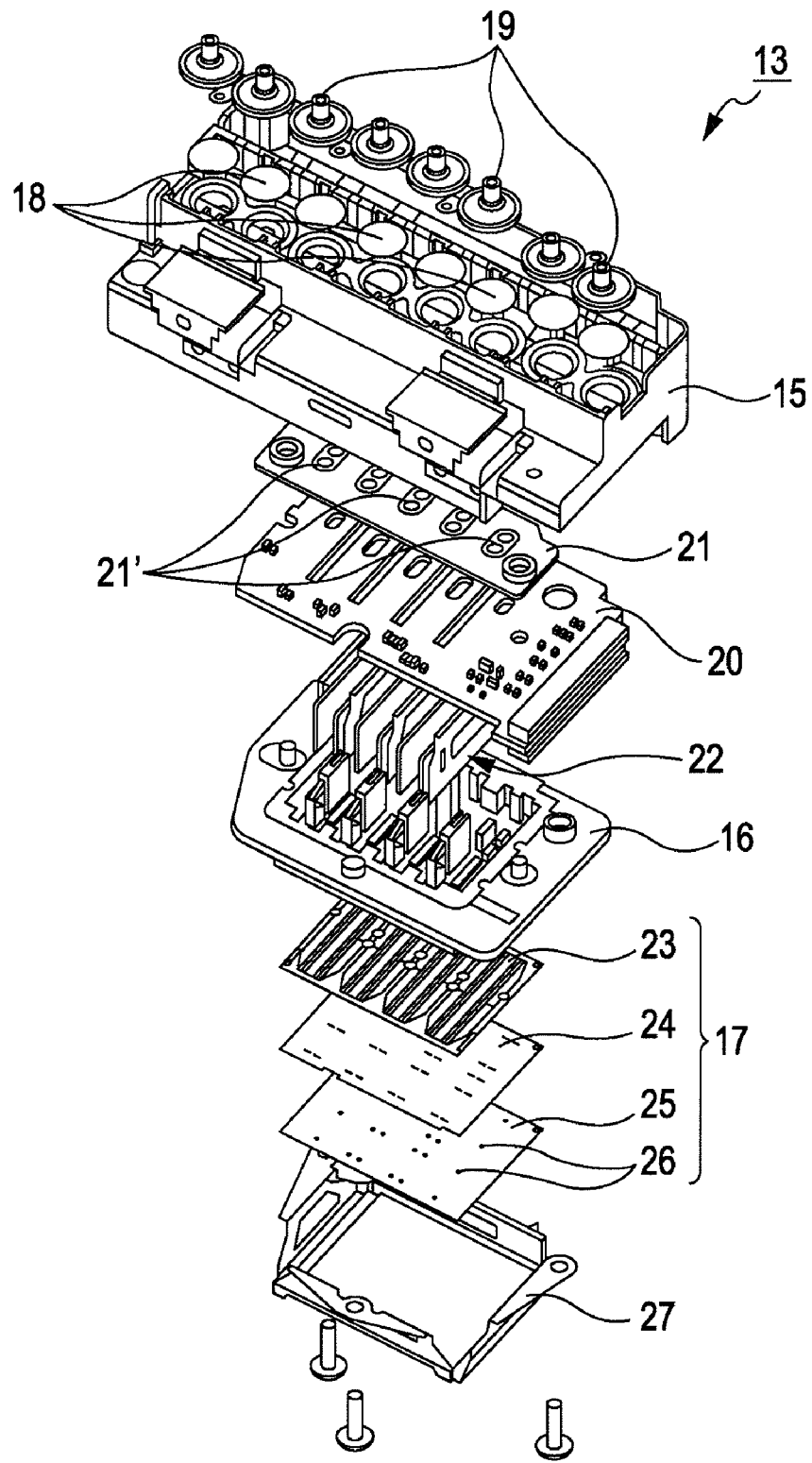
FIG. 3 is an exploded perspective view illustrating the structure of a recording head.
Figure 4:
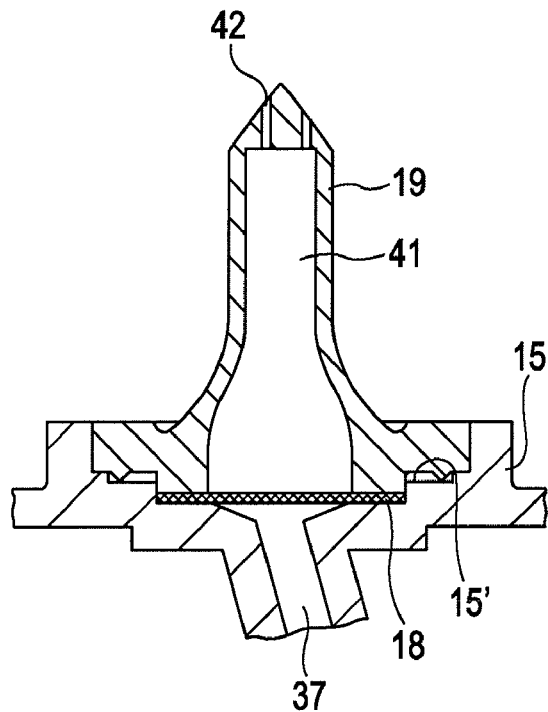
FIG. 4 is a cross-sectional view illustrating the structure of an ink introduction needle.

A recording apparatus of the invention is an ink jet recording apparatus including the ink set described above. Next, the structure a recording head 13 of the ink jet recording apparatus will be described. FIG. 3 is a schematic perspective view of the recording head 13 accommodated in a carriage (not shown). Furthermore, FIG. 4 is a cross-section view of an ink introduction needle 19 to be inserted into an ink cartridge.

The recording head 13 shown as an example includes a cartridge base 15 (hereinafter referred to as "base"). A head case 16 is attached to the base 15. A flow channel unit 17 is attached to (provided on) a leading end of the head case 16. The base 15 is formed by, for example, molding a synthetic resin and a plurality of partitions 15' (liquid storage member-mounting portions) are provided on the top surface of the base 15.

An ink introduction needle 19 is attached to each of the partitions 15' with a mesh filter 18 therebetween. An ink cartridge (not shown) is mounted on the partitions 15'. That is, the ink cartridge is disposed on the base 15. The ink introduction needles 19 that are inserted into the ink cartridge will be described in detail below. A circuit board 20 is attached to another surface of the base 15 opposite the partitions 15'. Furthermore, this circuit board 20 is attached to the base 15 with a sheet member 21 functioning as a gasket therebetween.

The head case 16 is fixed to the base 15 and functions as a casing for accommodating a vibrator unit 22 including a piezoelectric vibrator. Furthermore, a flow channel unit 17 is fixed, with an adhesive or the like, to a leading end surface of the head case 16, the end surface opposite the surface on which the base 15 is mounted. This flow channel unit 17 is produced by sequentially staking an elastic plate 23, a channel-forming substrate 24, and a nozzle plate 25, and integrating the resulting product by fixing with an adhesive or the like.

The nozzle plate 25 is a plate-like member prepared from a thin stainless steel plate, and has fine nozzle openings 26 arranged in line at a pitch corresponding to a dot-forming density of the printer. Furthermore, a head cover 27 is constituted by, for example, a thin plate member composed of a metal.

As shown in FIG. 4, the ink introduction needle 19 that is inserted into the ink cartridge is a hollow needle which has a conical shape at a tip of the upstream side and in which an ink introduction path 41 is provided inside thereof. The lower half portion of the ink introduction needle 19 has a tapered shape diverging from the upstream side to the downstream side. Furthermore, ink introduction holes 42 communicating the outside space with the ink introduction path 41 are provided at the leading end side of the ink introduction needle 19.

The ink introduction needle 19 is attached to the base 15 with the mesh filter 18 therebetween by, for example, ultrasonic welding. Accordingly, the ink introduction path 41 of the ink introduction needle 19 communicates with an ink communication path 37 of the head case 16.

Furthermore, when the ink cartridge (not shown) is set in a partition 15' of the base 15, the ink introduction needle 19 is inserted into a needle insertion opening of the ink cartridge, and an inside cavity of the ink cartridge communicates with the ink introduction path 41 in the ink introduction needle 19, with the ink introduction holes 42 therebetween. Next, the ink stored in the ink cartridge is introduced into the ink introduction path 41 through the ink introduction holes 42, and ejected from the nozzle opening 26 through the ink communication path 37.

When the diameter of the nozzle opening 26 of the recording head 13 of the ink jet recording apparatus is L μm, and the size of the openings of the mesh filter 18 provided in the ink introduction path 41 is W μm, the nozzle diameter L μm and the size W μm of the openings of the mesh filter 18 preferably satisfy the relationship $L \geqq 5W$. In the case where an ink composition containing a metallic pigment dispersion liquid used in the invention is used in an ink jet recording apparatus that satisfies this relationship, from the standpoints of preventing the nozzle openings 26 from clogging with the metallic pigment and ensuring ejection stability of the ink composition, the following condition is preferably satisfied. Specifically, when the average particle diameter of the equivalent circle diameter determined by the area of the X-Y plane of the plate-like particles is R μm, the number of plate-like particles satisfying the relationship $R > (L/5)$ is preferably 5% or less of the total number of plate-like particles.

Method of Recording Image

Figure 5:
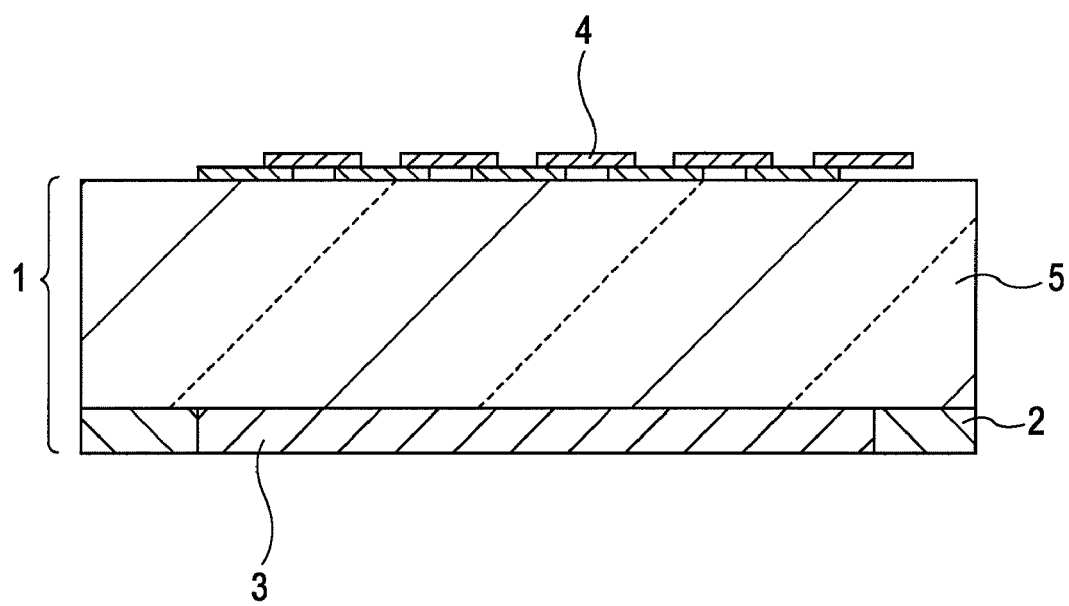
FIG. 5 is a schematic cross-sectional view showing an example of a method of forming an image using an ink set of the invention.

In the invention, a metallic image (metallic gloss image) with any color tone can be formed by another method of forming an image using the above-described ink set. For example, as shown in FIG. 5, on a surface of a visible light-transmissive recording medium 1 having an ink-accepting layer 2, a desired image is formed in the ink-accepting layer 2 using an oil-based ink composition for forming a color image, and a metallic pigment-adhering layer 4 is formed using an oil-based ink composition containing a metallic pigment on a surface opposite the surface having the ink-accepting layer 2 of the visible light-transmissive recording medium 1 thereon. Thus, a metallic gloss image with any color tone can be obtained while a dye 3, which is a colorant, does not interfere with a metallic gloss of the metallic pigment-adhering layer 4 functioning as an underlying layer when an observation surface is the ink-accepting layer 2 side of the visible light-transmissive recording medium 1.

Figure 6A:
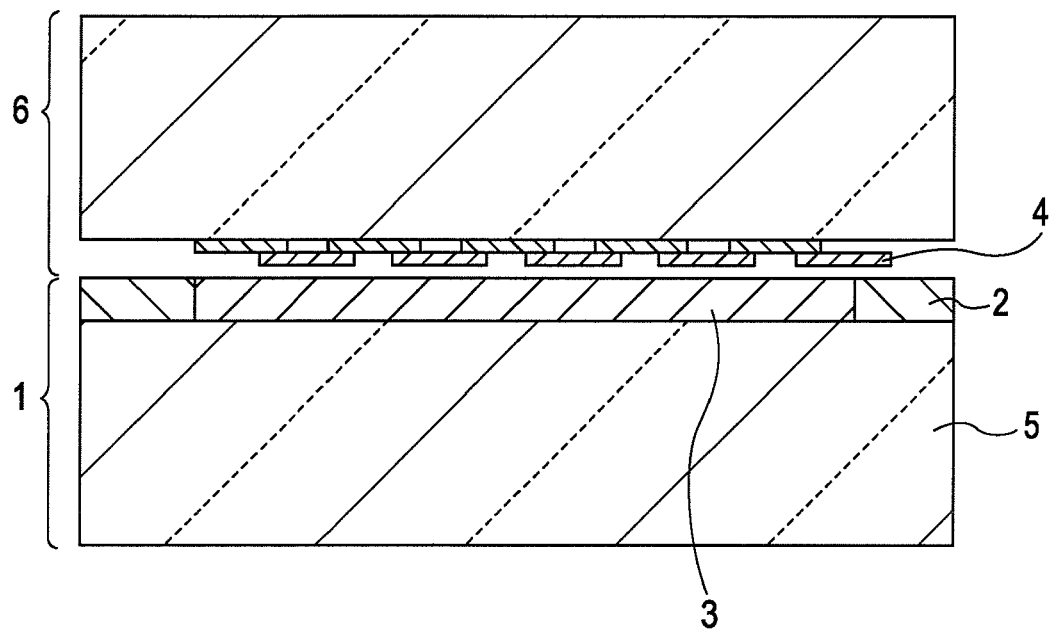
FIGS. 6A and 6B are schematic cross-sectional views each showing an example of a method of forming an image using an ink set of the invention.
Figure 6B:
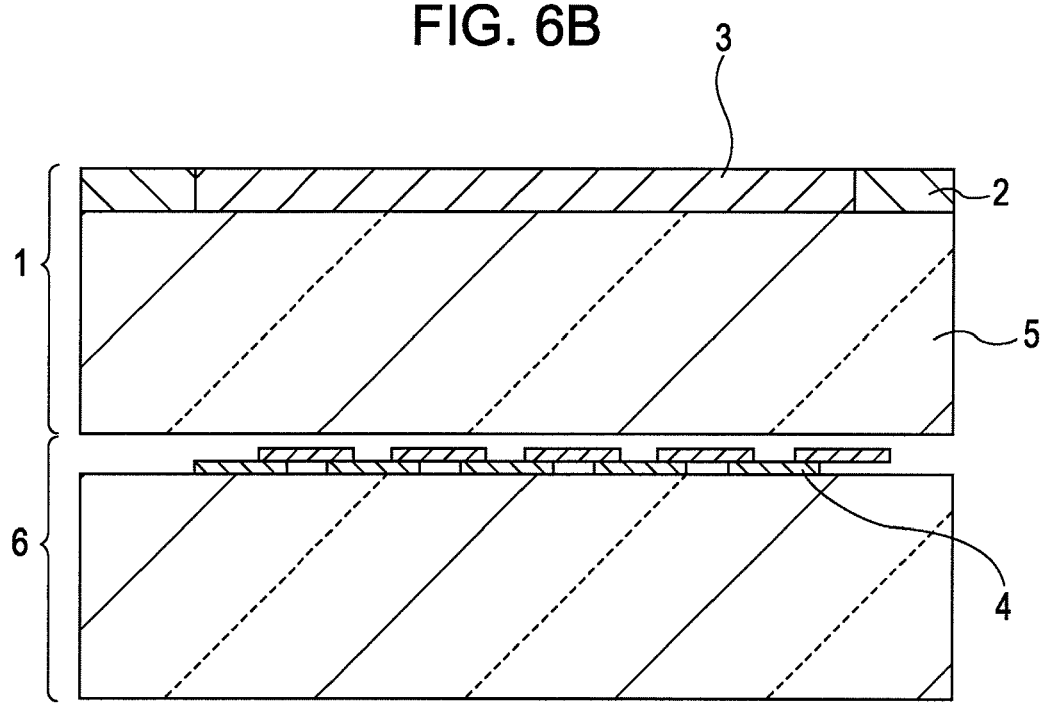

Alternatively, as shown in FIG. 6A, a visible light-transmissive recording medium 1 on which a desired image is formed in an ink-accepting layer 2 using an oil-based ink composition for forming a color image and a visible light-transmissive or visible light non-transmissive recording medium 6 on which a desired image is formed using an oil-based ink composition containing a metallic pigment may be stacked so that the color image and an adhering layer 4 of the metallic pigment are in contact with each other. Alternatively, as shown in FIG. 6B, such a visible light-transmissive recording medium 1 and such a visible light-transmissive or visible light non-transmissive recording medium 6 may be stacked so that the color image and an adhering layer 4 of the metallic pigment are disposed, with one of the visible light-transmissive recording media 1 and 6 therebetween. Also in these cases, a metallic gloss image with any color tone can be obtained while a dye 3, which is a colorant, does not interfere with a metallic gloss of the metallic pigment-adhering layer 4 functioning as an underlying layer.

Recorded Matter

A recorded matter of the invention is a matter recorded by the ink jet recording method or the method of recording an image described above using the above-described ink set. Since this recorded matter is obtained by the ink jet recording method or the method of recording an image using the above-described ink set, a recorded matter having a metallic image with any highly transparent color tone can be obtained.

EXAMPLES

1. Metallic Ink Composition (1) Preparation of Metallic Pigment Dispersion Liquid A resin coating solution containing 3.0 mass percent of cellulose acetate butyrate (butylation ratio: 35% to 39%, manufactured by Kanto Chemical Co., Inc.) and 97 mass percent diethylene glycol diethyl ether (manufactured by Nippon Nyukazai Co., Ltd.) was uniformly applied by a bar-coating method onto a PET film having a thickness of 100 μm, and then dried for 10 minutes at 60° C. to form a thin resin layer on the PET film.

Next, an aluminum vapor deposition layer having an average thickness of 20 nm was formed on the resin layer using a vacuum deposition apparatus (vacuum deposition apparatus model VE-1010, manufactured by Vacuum Device Inc.).

Next, detachment, pulverization, and dispersion treatments of the resulting laminate formed by the above method were simultaneously performed in diethylene glycol diethyl ether using a VS-150 ultrasonic dispersing device (manufactured by As One Corporation), thus preparing a metallic pigment dispersion liquid by ultrasonically dispersing for 12 hours in total.

The resulting metallic pigment dispersion liquid was filtered using an SUS mesh filter with an opening size of 5 μm to remove coarse particles. Subsequently, the filtrate was poured into a round bottom flask, and the diethylene glycol diethyl ether was distilled off with a rotary evaporator. Accordingly, the metallic pigment dispersion liquid was concentrated, and the concentration of the metallic pigment dispersion liquid was then adjusted. Thus, a metallic pigment dispersion liquid with a concentration of 5 mass percent was obtained.

Furthermore, the 50% average particle diameter R50 of an equivalent circle diameter determined by the area of the major axis (X direction)-minor axis (Y direction) plane of each of the metallic pigment particles, and the average film thickness Z were measured using a particle diameter and particle size distribution analyzer (FPIA-3000S manufactured by Sysmex Corporation), and R50/Z was calculated on the basis of the measured values of R50 and Z. Note that a particle size distribution value (CV value) was determined by the equation CV value=standard deviation of the particle size distribution/average particle diameter×100. The results are shown in Table 1.

TABLE 1

| Metallic pigment dispersion liquid | 50% average particle diameter R50 (μm) | Particle size distribution value (CV value) | Average particle diameter Rmax (μm) | Average film thickness Z (μm) | R50/Z |
|---|---|---|---|---|---|
| 1 | 1.03 | 44.0 | 4.9 | 0.02 | 51.5 |
| 2 | 1.43 | 48.9 | 6.9 | 0.02 | 71.5 |
| 3 | 2.54 | 47.2 | 7.2 | 0.02 | 127.0 |
| 4 | 1.13 | 44.8 | 5.9 | 0.02 | 56.5 |
| 5 | 1.02 | 48.4 | 5.7 | 0.03 | 34.0 |
| 6 | 0.91 | 45.1 | 4.2 | 0.02 | 45.5 |
| 7 | 0.86 | 46.6 | 4.3 | 0.02 | 43.0 |
| 8 | 0.89 | 38.2 | 3.2 | 0.02 | 44.5 |
| 9 | 5.52 | 81.2 | 30 | 0.10 | 55.2 |
| 10 | 1.42 | 65.0 | 12 | 0.30 | 4.7 |
| 11 | 1.40 | 60.2 | 7.1 | 0.30 | 4.7 |

(2) Preparation of Metallic Pigment Ink Composition

Metallic pigment ink compositions having the compositions shown in Table 2 were prepared using the metallic pigment dispersion liquids prepared by the method described above. Additives were mixed with and dissolved in solvents to prepare ink solvents. Subsequently, the metallic pigment dispersion liquids were added to the ink solvents, and each of the resulting mixtures was further blended and stirred with a magnetic stirrer for 30 minutes at room temperature and atmospheric pressure. Thus, metallic pigment ink compositions were prepared.

Diethylene glycol diethyl ether (DEGDE), dipropylene glycol monobutyl ether (DPGMB), and tetraethylene glycol dimethyl ether (TEGDM) manufactured by Nippon Nyukazai Co., Ltd. were used as those shown in Table 2. Furthermore, γ-butyrolactone manufactured by Kanto Chemical Co., Inc. was used. In addition, N-2043-AF-1 (resin emulsion) manufactured by Harima Chemicals Inc., and BYK-3500 (surfactant) manufactured by BYK Japan K.K. were used. Note that the units are expressed in mass percent.

TABLE 2

| Ink composition | Reference Examples | | | | | | | | Comparative Reference Examples | | |
|---|---|---|---|---|---|---|---|---|---|---|---|
| | 1 | 2 | 3 | 4 | 5 | 6 | 7 | 8 | 1 | 2 | 3 |
| DEGDE | 47.8 | 47.8 | 47.8 | 61.8 | 61.8 | 61.8 | 61.8 | 61.8 | 47.8 | 47.8 | 47.8 |
| DPGMB | 45 | 45 | 45 | | | | | | 45 | 45 | 45 |
| γ-Butyrolactone | | | | 15 | 15 | 15 | 15 | 15 | | | |
| TEGDM | | | | 18 | 18 | 18 | 18 | 18 | | | |
| N-2043-AF-1 | 6.0 | 6.0 | 6.0 | 4.0 | 4.0 | 4.0 | 4.0 | 4.0 | 6.0 | 6.0 | 6.0 |
| BYK-3500 | 0.2 | 0.2 | 0.2 | 0.2 | 0.2 | 0.2 | 0.2 | 0.2 | 0.2 | 0.2 | 0.2 |
| Pigment solid content | 1.0 | 1.0 | 1.0 | 1.0 | 1.0 | 1.0 | 1.0 | 1.0 | 1.0 | 1.0 | 1.0 |
| (Metallic pigment dispersion liquid) | (1) | (2) | (3) | (4) | (5) | (6) | (7) | (8) | (9) | (10) | (11) |

(3) Measurement of Glossiness

A black block was filled with an ink composition, and solid printing was performed using an ink jet printer EM-930C (manufactured by Seiko Epson Corporation) at room temperature on photographic paper (glossy) having an ink-accepting layer manufactured by the same company (Product number: KA450PSK). The amount of ink composition ejected at that time was 1.2 mg/cm$^2$, and the dry weight of the metal pigment was 12 μg/cm$^2$. The glossiness of the image obtained was measured using a glossmeter (MULTI Gloss 268 manufactured by Konica Minolta Holdings, Inc.). The results are shown in Table 3.

The criterion for evaluation of the glossiness is as follows:

20° glossiness
A: 300 or more (clear metallic gloss)
B: 200 or more and less than 300 (matte metallic gloss)
C: Less than 200 (no metallic gloss)

60° glossiness
A: 500 or more (clear metallic gloss)
B: 300 or more and less than 500 (matte metallic gloss)
C: Less than 300 (no metallic gloss)

85° glossiness
A: 120 or more (clear metallic gloss)
B: 100 or more and less than 120 (matte metallic gloss)
C: Less than 100 (no metallic gloss)

TABLE 3

| | Glossiness | | |
|---|---|---|---|
| | 20° glossiness | 60° glossiness | 85° glossiness |
| Reference Example 1 | B | B | B |
| Reference Example 2 | A | B | B |
| Reference Example 3 | B | B | B |
| Reference Example 4 | A | A | A |
| Reference Example 5 | A | A | A |
| Reference Example 6 | A | A | A |
| Reference Example 7 | A | B | A |
| Reference Example 8 | A | A | A |
| Comparative Reference Example 1 | — | — | — |
| Comparative Reference Example 2 | C | B | B |
| Comparative Reference Example 3 | A | B | B |

—: Not detected

Referring to the results shown in Table 3, when metallic pigments having an R50 in the range of 0.5 to 3 μm, and satisfying the relationship R50/Z>5 are used, an image having a desired metal gloss ranging from a matte image to a gloss image can be formed.

2. Ink Set (1) Preparation of Metallic Ink Composition

Metallic pigment ink compositions having the compositions shown in Table 4 were prepared using the metallic pigment dispersion liquid 4 prepared by the above method.

Additives were mixed with and dissolved in solvents to prepare ink solvents. Subsequently, the metallic pigment dispersion liquid was added to each of the ink solvents, and each of the resulting mixtures was further blended and stirred with a magnetic stirrer for 30 minutes at room temperature and atmospheric pressure. Thus, metallic pigment ink compositions (S1 and S2) were prepared.

Diethylene glycol diethyl ether (DEGDE) and tetraethylene glycol dimethyl ether (TEGDM) manufactured by Nippon Nyukazai Co., Ltd. were used as those shown in Table 4. Furthermore, γ-butyrolactone manufactured by Kanto Chemical Co., Inc. was used. In addition, N-2043-60MEX (polyacrylic polyol resin emulsion) manufactured by Harima Chemicals Inc., BYK-3500 (surfactant) manufactured by BYK Japan K.K., and E-1010 (surfactant) manufactured by Nissin Chemical Industry Co., Ltd. were used. Note that the units are expressed in mass percent.

TABLE 4

| Ink composition | Metallic ink composition | |
|---|---|---|
| | S1 | S2 |
| DEGDE | 61.8 | 61.0 |
| γ-Butyrolactone | 15.0 | 15.0 |
| TEGDM | 18.0 | 18.0 |
| N-2043-60MEX | 4.0 | 4.0 |
| BYK-3500 | 0.2 | — |
| E-1010 | — | 1.0 |
| Pigment solid content | 1.0 | 1.0 |

(2) Preparation of Oil-Based Ink Composition for Forming Color Image (Chromatic Color Ink Composition, Black Ink Composition, Colorless and Transparent Ink (Clear Ink) Composition, and White Ink Composition)

(2-1) Compositions of Dye Ink Compositions and Clear Ink Composition

A yellow ink composition, a magenta ink composition, a cyan ink composition, a black ink composition, and a clear ink composition having the compositions shown in Table 5 were prepared. Diethylene glycol diethyl ether (DEGDE) and tetraethylene glycol dimethyl ether (TEGDM) manufactured by Nippon Nyukazai Co., Ltd. were used as those shown in Table 5. Furthermore, γ-butyrolactone (γ-BL) manufactured by Kanto Chemical Co., Inc. was used. In addition, N-2043-60MEX (polyacrylic polyol resin emulsion) manufactured by Harima Chemicals Inc., and BYK-UV3500 (surfactant) manufactured by BYK Japan K.K. were used. In addition, various oil dyes manufactured by Ciba Specialty Chemicals Inc. were used. Note that, in Table 4, the units are expressed in mass percent.

(2-2) Method of Preparing Dye Ink Compositions and Clear Ink Composition

Additives were mixed with and dissolved in solvents to prepare ink solvents. Subsequently, dyes were added to the ink solvents, and each of the resulting mixtures was blended and stirred with a magnetic stirrer for 30 minutes at room temperature and atmospheric pressure. Thus, dye ink compositions were prepared. In addition, a clear ink composition was prepared by the same method except that no dye was used.

TABLE 5

| | Yellow Y | Magenta M | Cyan C | Black K | Clear CL |
|---|---|---|---|---|---|
| DEGDE | 61.8 | 61.8 | 61.8 | 61.8 | 62.8 |
| γ-BL | 15.0 | 15.0 | 15.0 | 15.0 | 15.0 |
| TEGDM | 18.0 | 18.0 | 18.0 | 18.0 | 18.0 |
| N-2043-60MEX | 4.0 | 4.0 | 4.0 | 4.0 | 4.0 |
| BYK-UV3500 | 0.2 | 0.2 | 0.2 | 0.2 | 0.2 |
| Colorant | ORACET Yellow 3GN 1.0 | ORACET Red BG 1.0 | ORACET Blue G 1.0 | ORASOL Black RLI 1.0 | — |

(2-3) Composition of Pigment Ink Composition

A yellow ink composition, a magenta ink composition, a cyan ink composition, a black ink composition, and a white ink composition having the compositions shown in Tables 6 and 7 were prepared. Except for a pigment component, the same additives shown in Table 5 were used in the white ink composition shown in Table 6. In Table 7, the "dispersant" is a polyester polymer compound, "N-2043-60MEX" is a polyacrylic polyol resin emulsion, the "mixed organic solvent" is a mixed solvent containing diethylene glycol diethyl ether (70 mass percent), γ-butyrolactone (15 mass percent), and tetraethylene glycol dimethyl ether (15 mass percent). The pigments shown in Tables 6 and 7 are C.I. Pigment Yellow 213, Pigment Violet 19, Pigment Blue 15:3, and Pigment Black 7. The numerical values in Tables 6 and 7 are expressed in mass percent.

The hollow resin emulsion in Table 7 was produced as follows. Hereinafter, unless otherwise stated, the term "parts" is calculated on the basis of the mass.

[1] Polymer Particles 1

First, 80 parts of styrene, 5 parts of methacrylic acid, 15 parts of methyl methacrylate, 1 part of α-methylstyrene dimer, 14 parts of t-dodecyl mercaptan, 0.8 parts of sodium dodecylbenzenesulfonate, 1.0 part of potassium persulfate, and 200 parts of water were placed in a 2-L reaction vessel. The mixture was stirred in nitrogen gas, and heated to 80° C. to conduct emulsion polymerization for 6 hours. Polymer particles 1 thus obtained had an average particle diameter of 150 nm (0.15 μm).

[2] Hollow Polymer Fine Particle Emulsion 1

First, 10 parts (in terms of solid content) of Polymer particles 1 obtained in [1] above, 0.3 parts of sodium lauryl sulfate, 0.5 parts of potassium persulfate, and 400 parts of water were placed in a reaction vessel. A cross-linking polymerizable monomer composition containing a mixture of 11.6 parts of divinylbenzene (purity: 55 mass percent; the remainder is a monofunctional vinyl monomer), 8.4 parts of ethylvinylbenzene, 5 parts of acrylic acid, and 75 parts of methyl methacrylate was added to the reaction vessel. An emulsion polymerization process was conducted while stirring the resulting mixture at 30° C. for one hour and further stirring at 70° C. for five hours, thus obtaining an aqueous dispersion liquid. The particle diameter of the particles in the prepared dispersion liquid was measured with a particle size analyzer (Microtrac UPA, manufactured by Nikkiso Co., Ltd.). According to the result, the particle diameter was 320 nm. Separately, the dispersion liquid was observed with a transmission electron microscope. It was confirmed that the dispersion liquid contained hollow polymer fine particles.

(2-4) Method of Preparing Pigment Ink Composition

The pigment ink composition (W) shown in Table 6 was prepared as follows.

[1] Method of Preparing Titanium Dioxide Fine Particles

A titanium-containing ore was dissolved with sulfuric acid to obtain a titanium sulfate solution. The titanium sulfate solution was hydrolyzed to obtain hydrous titanium oxide. Subsequently, 0.50 parts by mass of ammonium phosphate, 0.30 parts by mass of potassium sulfate, and 0.30 parts by mass of aluminum sulfate were added to 100 parts by mass of the hydrous titanium oxide in terms of $TiO_2$. The hydrous titanium oxide was heated in a laboratory rotary muffle furnace until the temperature of the resulting product reached 1,020° C. Titanium dioxide fine particles produced were cooled to room temperature, and observed with a transmission electron micrograph. According to the result, it was found that the fine particles were anatase $TiO_2$ particles having an average primary particle diameter of 0.13 μm.

[2] Preparation of Dispersion Liquid of Titanium Dioxide Fine Particles

First, 15 parts by mass of the titanium dioxide fine particles serving as a surface-treated white pigment, 5 parts by mass of a polyoxyalkylene-added polyalkylene amine (DISCOL N-518, manufactured by Dai-Ichi Kogyo Seiyaku Co., Ltd.) serving as a dispersant, and 80 parts by mass of diethylene glycol diethyl ether were mixed to prepare a slurry. Zirconia beads (1.0 mm diameter) were charged in an amount of 1.5 times the amount of slurry and dispersed for two hours with a sand mill (manufactured by Yasukawa Seisakusho). The beads were then removed to obtain a dispersion liquid of the titanium dioxide fine particles.

[3] Preparation of White Ink Composition (W)

A white ink composition (W) was prepared using the dispersion liquid of the titanium dioxide fine particles so as to have the composition shown in Table 6. Specifically, diethylene glycol diethyl ether, γ-butyrolactone, tetraethylene glycol dimethyl ether, N-2043-60MEX, and a surfactant were placed in a vessel, and sufficiently mixed for 30 minutes under stirring with a magnetic stirrer. The dispersion liquid was added to the resulting mixture, and the mixture was further mixed under stirring for one hour. The resulting product was filtered using a 10 μm PTFE membrane filter to prepare the white ink composition (W).

The pigment ink compositions (Y1, M1, C1, B1, and W1) shown in Table 7 were prepared as follows. First, among mixing components, a pigment, a dispersant, and a (portion of) mixed organic solvent were stirred with a dissolver at 3,000 rpm for one hour, and preliminary dispersion was then performed with a bead mill filled with zirconia beads (2 mm). Pigment particles obtained by this preliminary dispersion had an average particle diameter of 5 μm or less. Furthermore, dispersion was performed with a nanomill filled with zirconia beads (0.3 mm) to prepare a pigment dispersion liquid. The pigment particles obtained by this dispersion had an average particle diameter in the range of 50 to 200 nm.

Subsequently, N-2043-60MEX, a typical additive, a hollow resin emulsion, and (the rest of) the mixed organic solvent were mixed while stirring the pigment dispersion liquid at 4,000 rpm so that the amount of pigment in terms of parts by mass was adjusted to the amount in terms of mass percent shown in the composition described above. Thus, desired ink compositions (Y1, M1, C1, B1, and W1) were prepared.

TABLE 6

|  | White W |
|---|---|
| DEGDE | 57.8 |
| γ-BL | 15.0 |
| TEGDM | 18.0 |
| N-2043-60MEX | 4.0 |
| BYK-UV3500 | 0.2 |
| Colorant | Titanium dioxide 5.0 |

TABLE 7

|  | Yellow Y1 | Magenta M1 | Cyan C1 | Black B1 | White W1 |
|---|---|---|---|---|---|
| PY213 | 6.0 | — | — | — | — |
| PV19 | — | 6.0 | — | — | — |
| PB15:3 | — | — | 3.0 | — | — |
| PBk7 | — | — | — | 4.0 | — |
| Hollow resin emulsion | — | — | — | — | 11.0 |
| Dispersant | 2.0 | 3.0 | 2.0 | 2.0 | — |
| N-2043-60MEX | 4.0 | 4.0 | 4.0 | 4.0 | 5.0 |
| BYK-UV3500 | 0.2 | 0.2 | 0.2 | 0.2 | 0.2 |
| Mixed organic solvent | Remainder | Remainder | Remainder | Remainder | Remainder |

(3) Ink Set

Ink sets including ink compositions in combinations shown in Table 8 were prepared by using the metallic ink compositions obtained in (1) above and the oil-based ink compositions for forming a color image obtained in (2) above.

TABLE 8

| | Metallic ink | Chromatic color ink | Black ink | White ink | Clear ink | Result of print evaluation |
|---|---|---|---|---|---|---|
| Example 1 | S1 | Y, M, C | K | W | CL | S |
| Reference Example 9 | S1 | Y1, M1, C1 | B1 | W1 | — | AAA |
| Reference Example 10 | S2 | Y1, M1, C1 | B1 | W1 | — | AA |

(4) Print Evaluation Test

Ink sets were prepared by combining the metallic ink composition S1 (or S2) with the oil-based ink compositions for forming a color image, and a print evaluation test was performed using two ink jet printers PM-4000PX (manufactured by Seiko Epson Corporation). For a first ink jet printer, a black ink composition, a yellow ink composition, a magenta ink composition, and a cyan ink composition were filled in corresponding color blocks. For a second ink jet printer, the metallic ink composition S1 (or S2) was filled in a black block, the white ink composition was filled in a yellow block, and the clear ink composition was filled in a light cyan block.

Printing was performed at room temperature on photographic paper (glossy) having an ink-accepting layer (manufactured by Seiko Epson Corporation, Product number: KA450PSK) as in a printing pattern described below. Furthermore, a sensory evaluation of the printed matters was performed on the basis of an evaluation criterion described below. The results are shown in Table 8.

Printing Pattern

Printing was performed using the metallic ink composition and a drying process was performed. Subsequently, an image was printed on the metallic printed surface using the chromatic color ink compositions, the black ink composition, the white ink composition, and the clear ink composition. In the sensory evaluation of a printed matter described below, the evaluation was performed in an area where an image was formed using the dye-containing ink compositions other than the white ink composition and the clear ink composition.

Sensory Evaluation Criterion of Printed Matter

S: Any metallic gloss ranging from a high metallic gloss to a matte texture could be obtained, and in addition, any transparent, metallic color could be obtained.

AAA: Any metallic gloss ranging from a high metallic gloss to a matte texture could be obtained.

AA: A metallic gloss on which a reflection of an object can be clearly seen could be obtained.

As shown in Table 8, by employing the ink jet recording method using the above ink set, a recorded matter in which transparency was improved and which had a metallic image having any color tone could be obtained. Specifically, unlike pigments, by using dyes, transparent printing could be performed, and sharp full-color printing having a color tone without turbidity could be obtained. In addition, by using a black ink, a smoky texture could be provided to a printed image. The colorless and transparent clear ink could provide a function of protecting a metallic glossy surface. Furthermore, by using a white ink according to need, a matte texture could be partly provided on a metallic glossy surface.

What is claimed is:

1. An ink set comprising:
an oil-based ink composition containing a metallic pigment; and
at least one oil-based ink composition selected from the group consisting of a chromatic color ink composition containing a chromatic color oil dye, a black ink composition containing a black oil dye, and a colorless and transparent ink composition that does not contain a colorant, wherein the metallic pigment is composed of plate-like particles,
when the major axis of the plate-like particles in a plane thereof is represented by X, the minor axis thereof is represented by Y, and the thickness thereof is represented by Z, a 50% average particle diameter R50 of an equivalent circle diameter determined by the area of the X-Y plane of the plate-like particles is in the range of 0.5 to 3μm, and the metallic pigment satisfies the relationship $R50/Z>5$.

2. The ink set according to claim 1, further comprising:
a white oil ink composition containing a white pigment.

3. The ink set according to claim 1, wherein the metallic pigment is composed of aluminum or an aluminum alloy.

4. The ink set according to claim 1, wherein the metallic pigment is prepared by crushing a metal vapor-deposited film.

5. An ink set comprising:
an oil-based ink composition containing a metallic pigment; and
at least one oil-based ink composition selected from the group consisting of a chromatic color ink composition containing a chromatic color oil dye, a black ink composition containing a black oil dye, and a colorless and transparent ink composition that does not contain a colorant, wherein the metallic pigment is composed of aluminum or an aluminum alloy.

6. An ink set comprising:
an oil-based ink composition containing a metallic pigment; and
at least one oil-based ink composition selected from the group consisting of a chromatic color ink composition containing a chromatic color oil dye, a black ink composition containing a black oil dye, and a colorless and transparent ink composition that does not contain a colorant, wherein the metallic pigment is prepared by crushing a metal vapor-deposited film.

7. An ink set comprising:
an oil-based ink composition containing a metallic pigment; and
at least one oil-based ink composition selected from the group consisting of a chromatic color ink composition containing a chromatic color oil dye, a black ink composition containing a black oil dye, and a colorless and transparent ink composition that does not contain a colorant, wherein the oil-based ink composition containing a metallic pigment further contains an organic solvent and a resin, and wherein the organic solvent is a mixture of an alkylene glycol diether, an alkylene glycol monoether, and a lactone.

8. The ink set according to claim 1, wherein the oil-based ink composition containing a metallic pigment contains the metallic pigment in an amount in the range of 0.1 to 10.0 mass percent.

9. The ink set according to claim 7, wherein the organic solvent contains at least one alkylene glycol ether which is liquid at room temperature and atmospheric pressure.

10. The ink set according to claim 7, wherein the resin is at least one selected from the group consisting of polyvinyl butyral, cellulose acetate butyrate, polyacrylic polyols, polyurethanes, vinyl chloride-vinyl acetate copolymers, and resin emulsions thereof.

11. The ink set according to claim 7, wherein the oil-based ink composition containing a metallic pigment further contains at least one selected from the group consisting of acetylene glycol surfactants and silicone surfactants.

12. An ink jet recording method comprising:
ejecting droplets of an ink composition to cause the droplets to adhere to a recording medium having an ink-accepting layer,
wherein an image is formed utilizing the ink set according to claim 1.

13. The ink jet recording method according to claim 12, wherein an image is formed by ejecting the oil-based ink composition containing a metallic pigment, and at least one oil-based ink composition selected from the group consisting of the chromatic color ink composition, the black ink composition, and the colorless and transparent ink composition at the same time.

14. The ink jet recording method according to claim 12, wherein an image is formed utilizing the oil-based ink composition containing a metallic pigment, and an image is then formed utilzing at least one oil-based ink composition selected from the group consisting of the chromatic color ink composition, the black ink composition, and the colorless and transparent ink composition.

15. The ink jet recording method according to claim 12, wherein an image is formed utilizing at least one oil-based ink composition selected from the group consisting of the chromatic color ink composition, the black ink composition, and the colorless and transparent ink composition, and an image is then formed utilizing the oil-based ink composition containing a metallic pigment.

16. The ink jet recording method according to claim 12, wherein the recording medium is a visible light-transmissive recording medium.

17. The ink jet recording method according to claim 12, wherein printing is performed while heating the recording medium before printing and/or during printing and/or after printing.

18. The ink jet recording method according to claim 17, wherein the heating temperature is in the range of 30° C. to 80° C.

19. A recorded matter recorded by the ink jet recording method according to claim 12.

20. An ink jet recording apparatus comprising:
the ink set according to claim 1.

\* \* \* \* \*